United States Patent [19]

Davis et al.

[11] 4,319,298

[45] Mar. 9, 1982

[54] MOTOR PROTECTION DEVICE

[75] Inventors: Richard K. Davis; Ramesh N. Jani, both of Charlottesville, Va.

[73] Assignee: General Electric Company, Salem, Va.

[21] Appl. No.: 70,296

[22] Filed: Aug. 28, 1979

[51] Int. Cl.³ .............................................. H02H 7/08
[52] U.S. Cl. ...................................... 361/24; 361/27; 361/44
[58] Field of Search ....................... 361/23, 24, 25, 27, 361/31, 76, 77, 87, 93, 96, 97, 106; 364/482, 483; 340/648, 664, 331, 715

[56] References Cited

U.S. PATENT DOCUMENTS

| | | |
|---|---|---|
| 3,845,354 | 10/1974 | Boothman et al. |
| 3,848,160 | 11/1974 | Boothman et al. |
| 3,979,657 | 9/1976 | Yorksie .......................... 340/663 X |
| 3,984,737 | 10/1976 | Okamura et al. ............... 364/483 X |
| 4,041,540 | 9/1977 | Kampf et al. .......................... 361/24 |
| 4,097,790 | 6/1978 | Wilson .................................. 318/471 |
| 4,219,858 | 8/1980 | De Puy et al. ........................ 361/93 |

FOREIGN PATENT DOCUMENTS 962088  2/1975  Canada .
983094  2/1976  Canada .

OTHER PUBLICATIONS

"Thermal Tracking-A Rational Approach to Motor Protection"-Boothman et al., IEEE Paper T 74 029-5.

*Primary Examiner*—Harry E. Moose, Jr.
*Attorney, Agent, or Firm*—James H. Beusse; William H. Steinberg

[57] ABSTRACT

A motor protection device is provided that monitors motor currents and motor temperatures and provides protective functions whose characteristics are based on field settable data and motor operating conditions. The protective functions provided are overtemperature, overload, instantaneous overcurrent, ground fault, phase unbalance, and phase reversal. Field settable data is entered by means of a keyboard and consists of motor trip points for the protective functions, and motor and system parameters.

13 Claims, 12 Drawing Figures

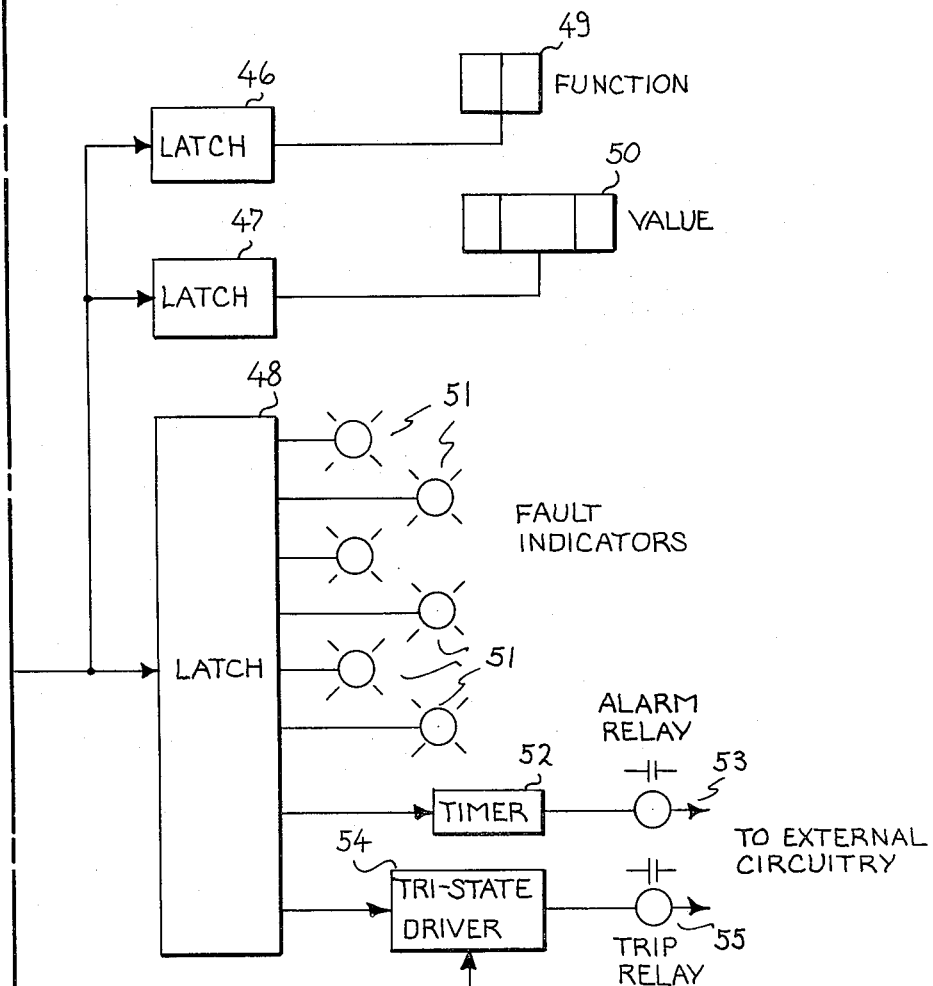

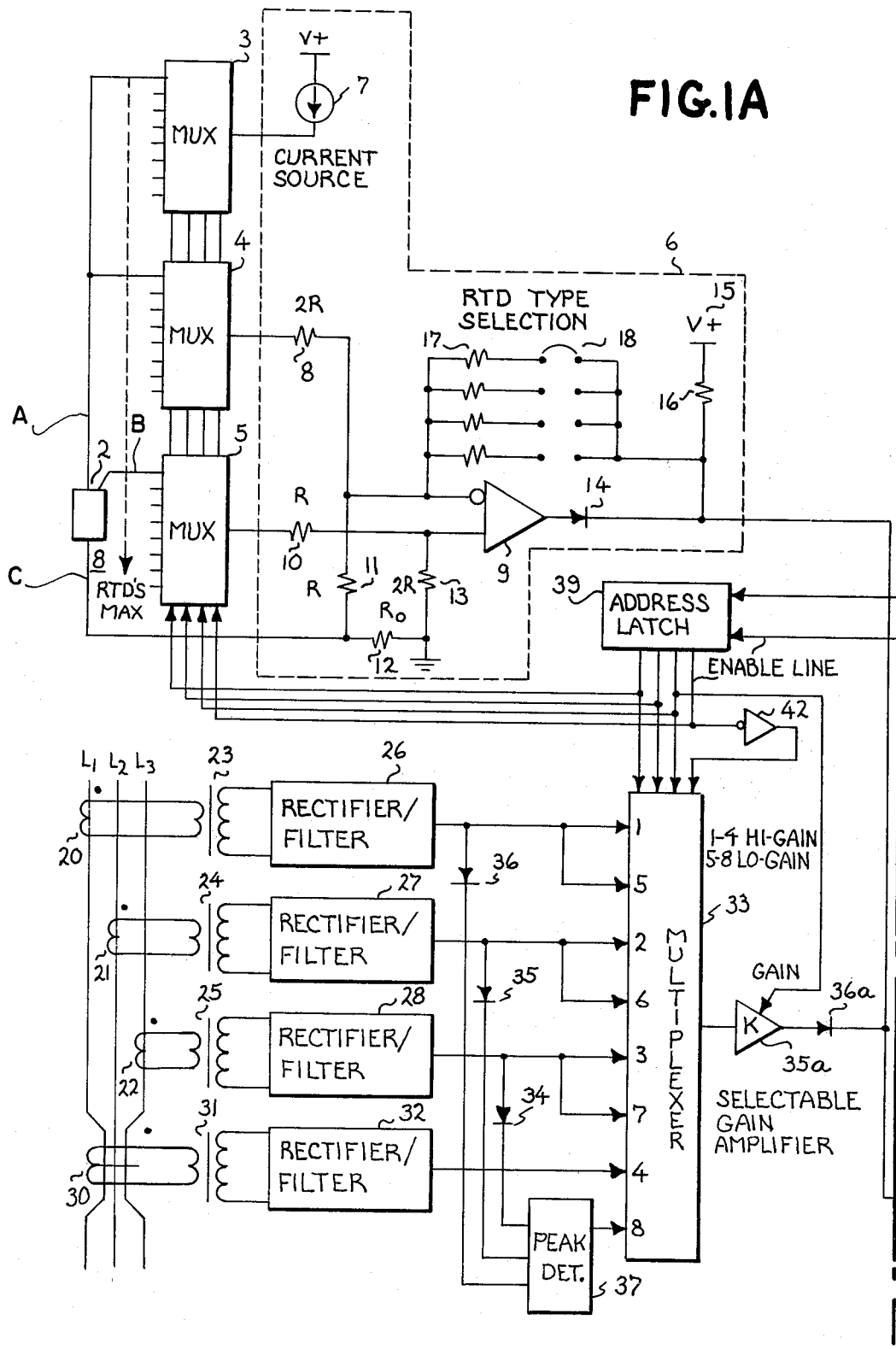

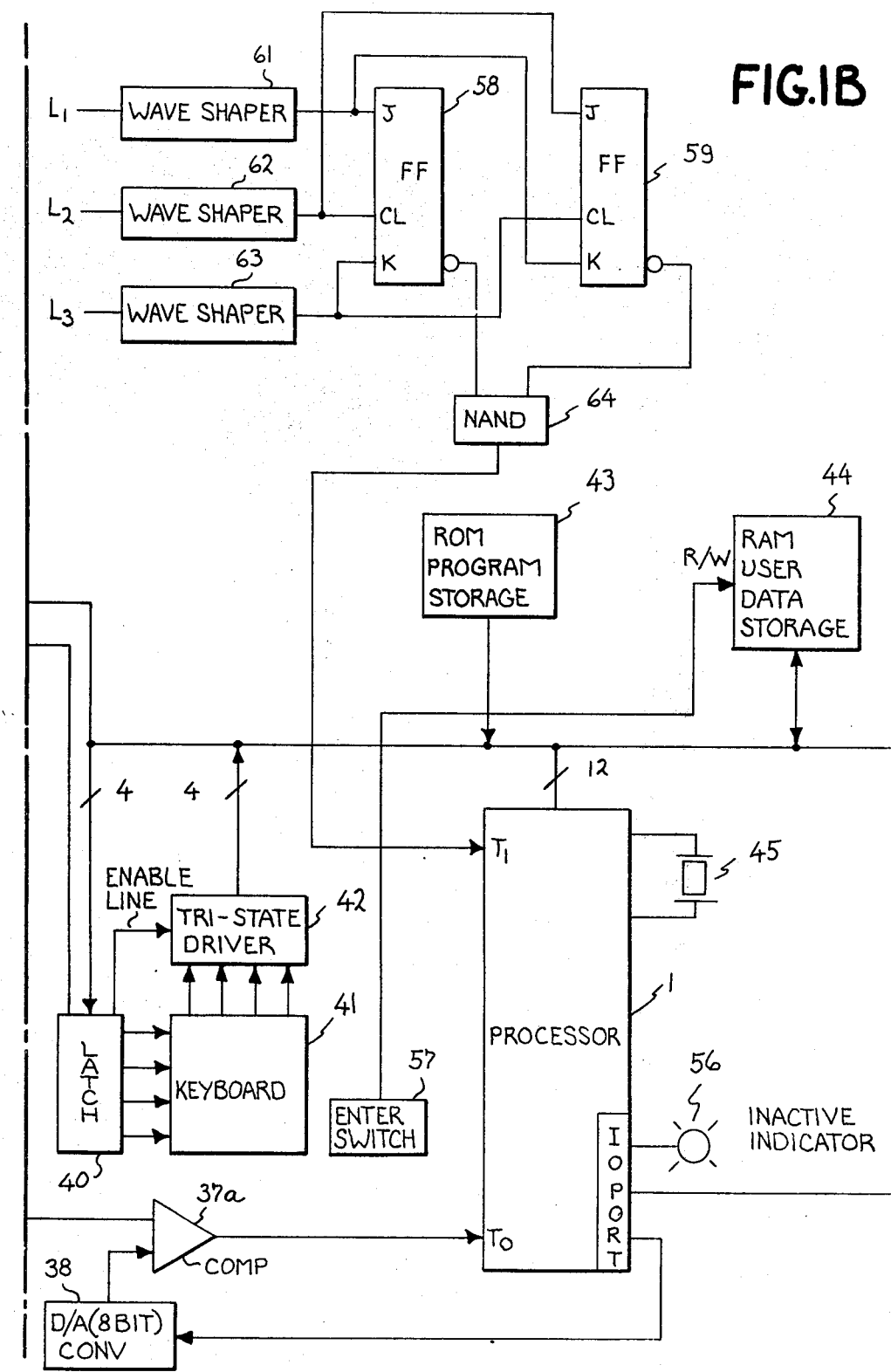

PHASE UNBALANCE TRIP CHARACTERISTIC.

MOTOR PROTECTION DEVICE

BACKGROUND OF THE INVENTION

This invention relates to protective systems for electric motors. More specifically, it relates to overload, overtemperature, phase unbalance, overcurrent, and ground fault protection for electric motors.

Unnecessary motor shut-downs from premature relay trips can rob a critical process, industry, or utility of valuable operating time. A relay that does not trip soon enough can result in a heat damaged or burned-out motor which also results in lost operating time. Critical operations that require high reliability drives need motors that have precise protection.

A bimetal type relay provides overload protection against motor overheating under steady state conditions. Bimetal relays, however, cannot accurately reproduce the temperature of motor elements under transient and cyclic conditions of short time durations. Therefore, bimetal relays do not provide good protection for repeated starts or hot starts and may trip prematurely on cyclic loads.

Most large motors have resistance temperature detectors placed in the stator slots and near bearings. Resistance temperature detectors (RTD's) are essentially resistance elements of copper, platinum or nickel. Measuring the resistance of the RTD's installed in the motor gives an indication of motor winding and bearing temperatures. The use of a thermal analog of a motor having motor current inputs and winding temperature inputs from RTD's closely approximates the heating characteristics of most motors during both starting and steady state operations. The IEEE paper Thermal Tracking—A Rational Approach to Motor Protection T74029-5 discusses a thermal analog using RTD's and motor current inputs that precisely tracks motor temperature changes precisely as they occur; rapidly during stall, more slowly during gradual load increases, and takes accurate account of temperatures during cooling. The IEEE paper is hereby incorporated by reference.

A relay using an accurate thermal analog of a motor, while a vast improvement over the bimetal type relay, has some disadvantages. One disadvantage is that it is not readily adjustable in the field. Many times the calculated motor data, given initially by the motor designer, does not agree with the actual motor data obtained in tests in the field. These differences necessitate adjustment of the relay which requires returning the relay unit to the factory for adjustment or the use of expensive field equipment for adjustment.

Another disadvantage to the thermal analog relays is that should an RTD open, the high resistance of the open RTD input would then be mistakenly interpreted as indicating a very high temperature which in turn would cause a premature trip of the motor.

An object of the present invention is to provide a motor protection device that has field adjustable set points, for the various functions monitored, that do not require special instrumentation or tools to enter.

Another object of the present invention is to provide a motor protection device that can monitor more than one winding RTD and more than one bearing RTD.

Another object of the present invention is to provide a motor protection device that disregards open RTD's.

SUMMARY OF THE INVENTION

A motor protection device is provided that monitors motor currents and motor temperatures and provides protective functions whose characteristics are based on field settable data and motor operating conditions. The protective functions provided are overtemperature, overload, instantaneous overcurrent, ground fault, phase unbalance, and phase reversal. Field settable data is entered by means of a keyboard and consists of motor trip points for the protective functions, and motor and system parameters.

The values of the protective functions (bearing temperature for bearing overtemperature protection or percent phase unbalance for phase unbalance protection, for example) are compared to the entered trip points for the protective functions and if the values of the protective functions exceeds the trip point, a trip relay is activated.

DESCRIPTION OF THE DRAWINGS

While the specification concludes with claims particularly pointing out and distinctly claiming the present invention, the objects and advantages of the invention can be more readily ascertained from the following description of a preferred embodiment when used in conjunction with the accompanying drawings in which:

FIGS. 1, 1A, 1B and 1C constitute a schematic block diagram of a motor protection device in accordance with the present invention.

DESCRIPTION OF THE PREFERRED EMBODIMENT

Figure 2:
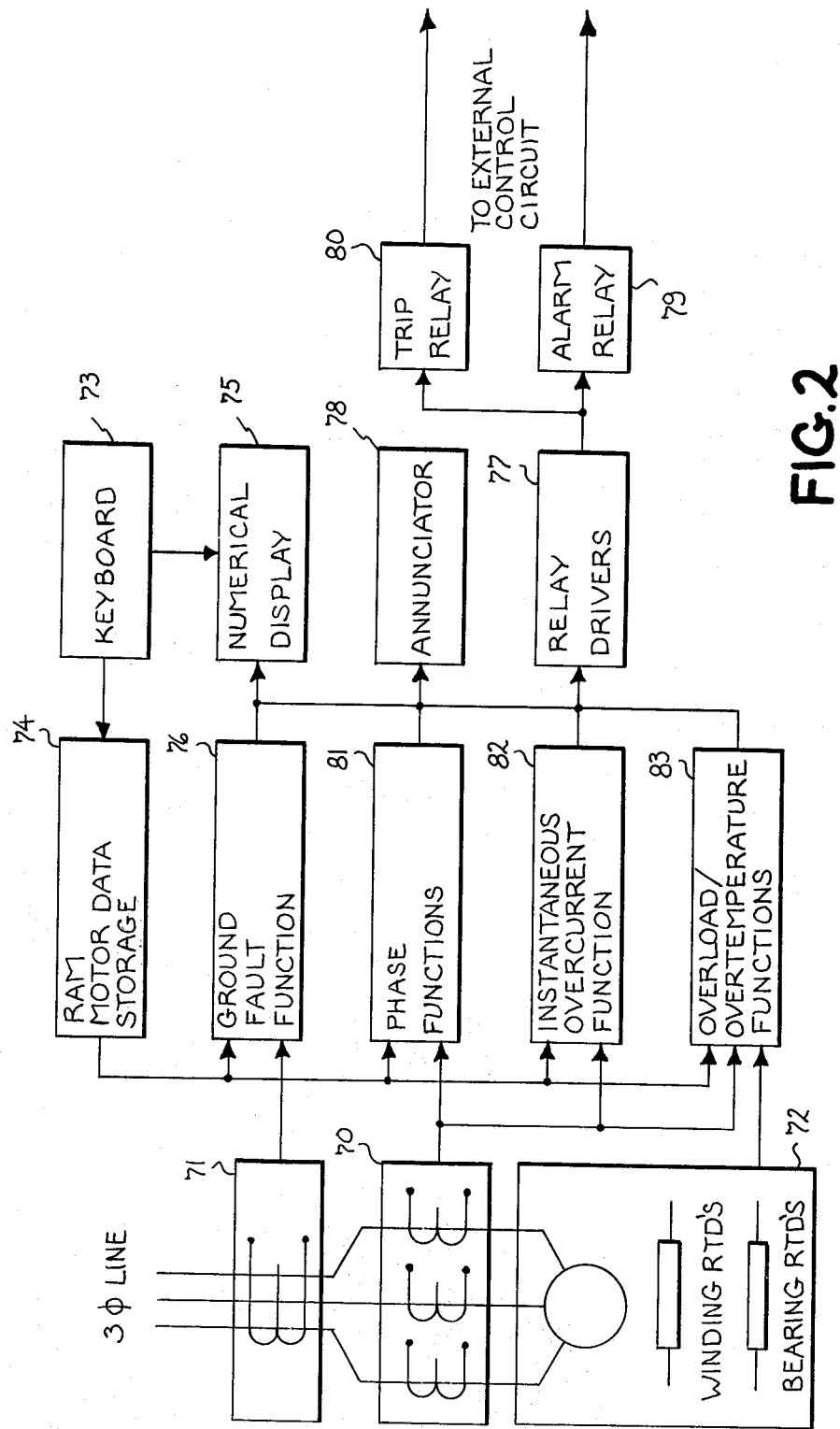
FIG. 2 is a functional block diagram of a motor protection device in accordance with the present invention.

Referring to FIG. 1, the inputs and outputs of processor 1 are shown. Starting with the analog inputs, up to six resistance temperature detectors (RTD's) 2 for measuring winding temperatures and up to two RTD's for measuring bearing temperatures can be used. RTD's are located in a motor (not shown) to be protected. Each RTD 2 has two terminals with two leads A and B connected to one terminal and a lead C connected to the other. Each A lead is connected to an input of eight to one multiplexers 3 and 4. Each B lead is connected to an input of an eight to one multiplexer 5. The output of multiplexers 4 and 5 and all the C leads are connected to an RTD input bridge circuit 6. Up to 6 winding RTD's are connected to the first six inputs of the multiplexers 3, 4 and 5 while the bearing RTD's are always connected to the seventh and eighth inputs of the multiplexers 3, 4 and 5.

The RTD input bridge circuit 6 has a current source 7 connected through a multiplexer 3 to the A leads. A resistor 8 which has the value of 2R is connected through multiplexer 4 to the A leads as well. The other side of the resistor is connected to the inverting input of an operational amplifier 9. A resistor 10 with a value of R is connected through the multiplexer 5 to the B leads. The other side of resistor 10 is connected to the non-inverting input of operational amplifier 9. Connected to the non-inverting input of operational amplifier 9 and ground are two resistors in series; resistor 11, which has the value of R and resistor 12 which has the value of $R_0$. The resistor 12 is connected to ground. Connected to the junction between resistors 11 and 12 are all the C leads from the RTD's 2. Connected between the non-inverting input of operational amplifier 9 and the ground is a resistor 13 with a value of 2R. The output of operational amplifier 9 is connected to diode 14 which in turn connects to the input of comparator 37a. Feedback resistors 17, one of which is in series with link 18, are connected between the inverting input of operational amplifier 9 and the output of diode 14. A power supply 15 is also connected to the input of comparator 37a through a resisstor 16.

Another analog input to processor 1 is obtained from current transformers 20, 21, 22 connected to lines $L_1$, $L_2$ and $L_3$. Line $L_1$, $L_2$ and $L_3$ feed the motor (not shown) to be protected. Each current transformer 20, 21 and 22 is connected to an isolation transformer 23, 24 and 25, respectively. The output of each isolation transformer 23, 24 and 25 is connected respectively to a rectifier/filter 26, 27 and 28. All three lines $L_1$, $L_2$ and $L_3$ pass through a window-type current transformer 30. The output of the window-type current transformer 30 is connected to an isolation transformer 31 and then to a rectifier/filter 32.

The output of each of the rectifier/filters 26, 27, 28 and 32 are connected to the first four inputs of an 8 to 1 multiplexer 33. The outputs of the rectifier filters 26, 27 and 28 are also connected respectively to input 5, 6 and 7 of multiplexer 33 and to diodes 34, 35 and 36. Diodes 34, 35 and 36 are connected to a peak detector 37 which in turn is connected to the eighth input of the multiplexer 33. The output of the multiplexer 33 is connected to a selectable gain amplifier 35a. The output of the amplifier 35a is connected through diode 36a to an input of comparator 37a. The output of comparator 37a is connected to an input $T_O$ on processor 1. An 8 line output from the input/output port of processor 1 is connected to an 8-bit digital-to-analog converter 38, the output of which is connected to the other input of comparator 37a.

Address latch 39 is connected by means of a bus to processor 1. The output of address latch 39 is connected to multiplexers 3, 4 and 5 as well as multiplexer 33 by four address lines. The address line indicative of the most significant bit has an inverter 42 between the latch 39 and multiplexer 33. The address line indicative of the second most significant bit is also connected to the gain selector of the selectable gain amplifier 35a.

The field setable data is entered by means of keyboard 41 and an ENTER switch 57 which is connected to the read write enable line of a battery powered random access memory (RAM) 44. The latch decoder 40 provides four input lines to the keyboard 41. The latch decoder 40 also provides an enable line to address latch 39. The keyboard 41 is connected to a tri-state driver 42 which is connected by means of a bus to the processor 1. The tri-state driver 42 is enabled by a line from the latch decoder 40.

A program read-only memory (ROM) 43 and the battery powered random access memory (RAM) 44 are both connected to the processor 1 by a bus. A crystal oscillator 45 is connected to processor 1 to provide an internal timing reference.

Lines $L_1$, $L_2$ and $L_3$ are connected to a J-K flip-flop 58 and a J-K flip-flop 59 through three waveshapers 61, 62 and 63, one for each line. The output of waveshaper 61 is connected to the J input of flip-flop 58 and the K input of flip-flop 59. The output of waveshaper 62 is connected to the clock input of flip-flop 58 and the J input of flip-flop 59. The output of the waveshaper 63 is connected to the K input of flip-flop 58 and the clock input of flip-flop 59. The inverting output of flip-flop 56 and the inverting output of flip-flop 59 each provide an input to NAND gate 64. The output of NAND gate 64 is connected to an input $T_1$ of processor 1 and supplies phase reversal information.

Outputs from the processor are connected to latches 46, 47 and 48 by means of a bus. Latch 46 is connected to a function display 49. Latch 47 is connected to a value display 50. Latch 48 is connected to six fault indicators 51 and to a timer 52. Timer 52 is connected to a normally energized alarm relay 53. Latch 48 is also connected to a tri-state driver 54 which in turn is connected to a trip relay 55 which is normally de-energized. The alarm relay 53 and the trip relay 55 are connected to external control circuitry, not shown. An enable signal is connected to the tri-state driver 54 from the input/output port of processor 1. Another output from the processor is a line from the input/output port to an inactive indicator light 56.

The operation of the motor protective device will now be described. First, the overall operation will be broadly described. Referring to FIG. 2, which is composed of functional blocks, the reference numerals used in this figure are used in this figure only. Other figures in the specification are like numerals for like elements. The motor protection device monitors motor line currents by means of current transformers in block 70 and monitors fault currents by means of a window-type current transformer in block 71. Temperatures of motor windings and bearings are monitored by RTD's located in the motor in block 72. Protective functions are provided with characteristics based on field settable data which is made up of trip points, and motor and system parameters which are entered through the keyboard block 73. The field settable data points are stored in a RAM motor data storage located in block 74. The numerical display block 75 provides visual feedback that the proper key has been entered and received.

The ground fault function block 76 receives data from block 74 and ground fault current input information from block 71. If the ground fault current is 67% of the trip point an alarm condition is given. The ground fault function 76 and the other protective functions are all connected to the relay drivers block 77 an annunciator block 78. An alarm condition from a function block causes the relay driver to activate the alarm relay in block 79 which is connected to an alarm, not shown. In addition a ground fault indicator light in the annunciator block 78 flashes. When the ground fault current exceeds the trip point a trip signal is given. The relay drivers block 77 is also connected to a trip relay located in block 80. A trip condition in one of the function blocks causes the trip relay to be activated and external control circuits interrupt power to the motor. The flashing indicator light in annunciator block 78 stays lit to indicate the reason for the trip.

The phase function block 81 which includes phase unbalance, phase loss, and phase reversal functions has inputs from the current transformer block 70 and the RAM motor data storage 74. When 67% of the trip point is reached, an alarm signal is given. When the trip point has been exceeded, a trip signal is given.

The instantaneous overcurrent function in block 82 has inputs from the current transformer block 70 and the RAM motor data storage block 74. When the overcurrent exceeds the trip point the trip condition exists. Since the device responds to a single cycle of overcurrent no alarm condition precedes the trip. The instantaneous overcurrent indicator in the annunciator block 78 is lit during the trip condition.

switch 88, SCAN switch 90, STORE switch 91 and RESET switch 92. The switches are in the form of pushbuttons. The panel also contains a two-digit Function display 93, a two and a half digit Value display 94. There is an Inactive light 96 and an annunciator panel 97 containing six fault indicators. In addition, there is an ENTER switch 95 located to the left of the Inactive light 96.

Each motor/system parameter is assigned to a number called a Function number as shown below. Function numbers 0 to 12 are measured motor parameters. Function numbers 15 to 28 contain field settable data consisting of trip points and motor and system parameters which must be entered by the user into random access memory 44.

| FUNCTION NUMBER | MEASURED AND DISPLAYED VALUES | UNITS | |
|---|---|---|---|
| 0 | Maximum Winding RTD Temperature | °C. | |
| 1 | RTD1 Winding Temperature | °C. | |
| 2 | RTD2 Winding Temperature | °C. | |
| 3 | RTD3 Winding Temperature | °C. | |
| 4 | RTD4 Winding Temperature | °C. | |
| 5 | RTD5 Winding Temperature | °C. | |
| 6 | RTD6 Winding Temperature | °C. | |
| 7 | RTD1 Bearing Temperature | °C. | |
| 8 | RTD2 Bearing Temperature | °C. | |
| 9 | Line 1 Current | % FLC | |
| 10 | Line 2 Current | % FLC | |
| 11 | Line 3 Current | % FLC | |
| 12 | Ground Fault Current | % Trip Current | |

| FUNCTION NUMBER | TRIP POINTS MOTOR/ SYSTEM PARAMETERS | UNITS | VALUE LIMITS |
|---|---|---|---|
| 15 | Total number winding RTD's | Qnty. | 0-6 |
| 16 | Total number bearing RTD's | Qnty. | 0-2 |
| 17 | Winding RTD trip temperature | °C. | 20-155 |
| 18 | Bearing RTD trip temperature | °C. | 20-155 |
| 19 | Full Load Current (FLC) | % CT secondary | 20-100 |
| 20 | Locked Rotor Current | X FLC | 3-12 |
| 21 | Stall Time | Sec. | 1-99 |
| 22 | Instantaneous Overcurrent | X FLC | 3-15 |
| 23 | Phase Unbalance Trip Current | % FLC | 5-30 99 disables function |
| 24 | Ground Fault Trip Current | % of/Amp | 5-100 |
| 25 | Ground Fault Trip Time Delay | Sec. | 0.10-0.99 |
| 26 | Phase Reversal | Number | 1 disables function 2 enables function |
| 27 | Time Overcurrent Trip (Ultimate Current) | % FLC | 100-120 |
| 28 | Reset Mode | Number | 51 manual reset 85 autamatic reset |

The overload/overtemperature function block 83 has input from the RTD's in block 72, current transformers in block 70, and RAM motor data storage in block 74. A motor temperature analog is used in the overload/overtemperature functions and an alarm signal is given when the motor temperature is 10° C. from the trip point. A trip signal is given when the trip point is reached. It is also possible to have overload/overtemperature protection of block 83 without RTD input from block 72. Motor temperature would be calculated from just the current inputs from block 70.

Figure 3:
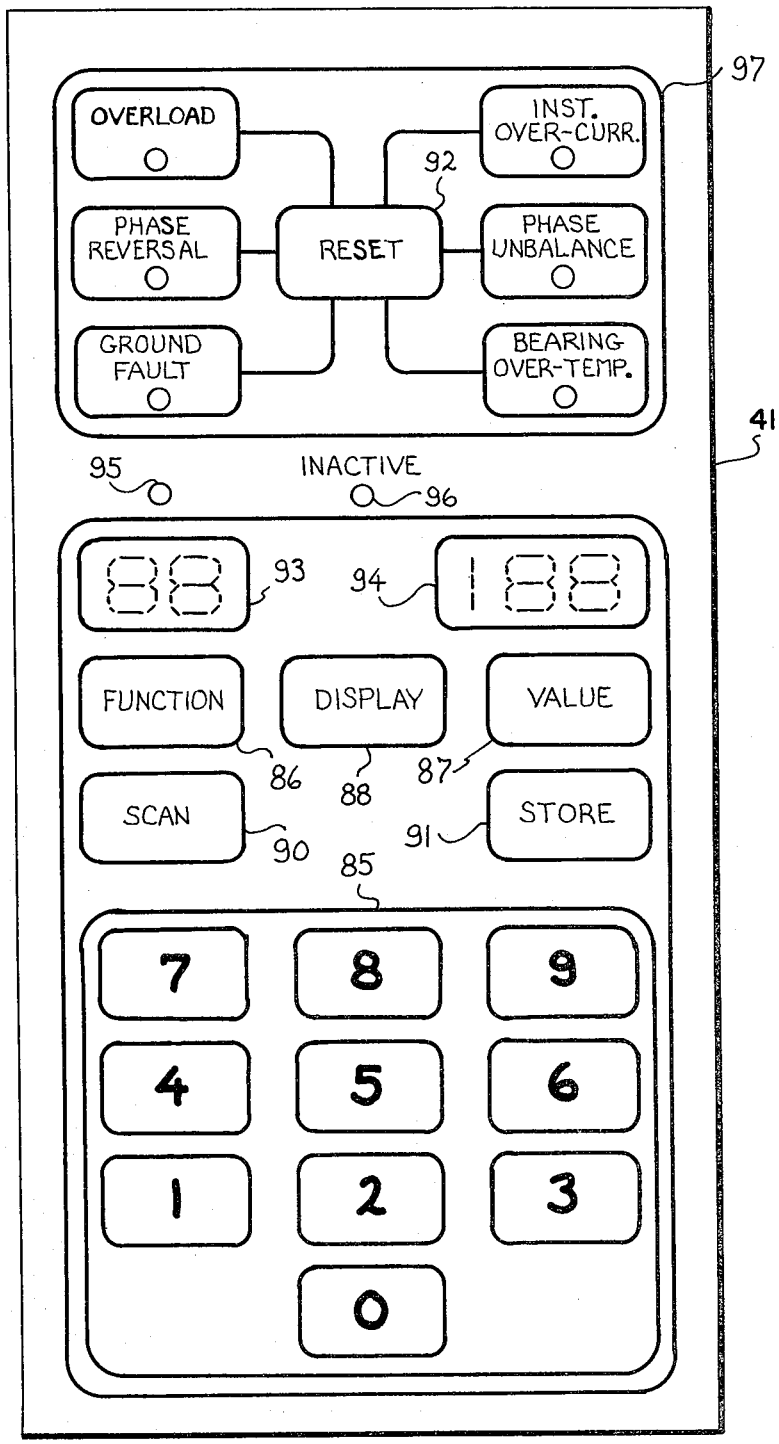
FIG. 3 is the front panel of a motor protection device in accordance with the present invention.

Turning now to the specific elements, FIG. 3 shows the front panel of the motor protection device. The front panel has a keyboard 41 which has 16 inputs which consists of zero to nine numerals 85, FUNCTION switch 86, VALUE switch 87, DISPLAY If winding RTD's are used, Function 27 should always be selected to be 120% of full load current. If winding RTD's are not used, Function 27 must be used to select an ultimate current of 100-120% of full load current.

The specific data for each of the above functions 15 through 28 must be established and stored in the random access memory 44 before protection can begin. For example, if a motor had the following data for a particular application.
Full Load Current (FLC)=400 A
Locked Rotor current=6×FLC or 2400 A
Instantaneous Overcurrent=10×FLC or 4000 A
Stall Time=5 seconds
Phase Unbalance Trip Current=20%×FLC or 80 A
Ground Fault Trip current=18 A
Line CT Ratio=500:5

Ground Fault CT Ratio=100:5.

The following information will be obtained for function No. 15 through 28.

Total number of winding RTD's: 3
Total number of bearing RTD's: 2
Winding RTD trip temperature: 130° C.
Bearing RTD trip temperature: 100° C.
Full load current (% of CT rating): 80%
Locked rotor current: 6×FLC
Stall Time: 5 Sec.
Instantaneous overcurrent: 10×FLC
Phase unbalance trip current: 20% of FLC
Ground fault trip current: 90% of 1 A
Ground fault trip time delay: 0.50 Sec.
Phase reversal: Yes 2
Time overcurrent trip (ultimate current): 120% FLC
Type reset: Automatic 85
Values are calculated as follows:

Full load current (FLC)=(400 A/500 A)×100%=80% of CT rating
  Locked rotor current (LRC)=(2400 A/400 A)=6×FLC
  Phase unbalance=(80 A/400 A)×100%=20% of FLC
  Ground Fault=18 A×(5/100)×100%=90% of 1 A
  Time overcurrent trip—Always set to 120 when winding RTD's are used.

Data would be entered into each function 10 through 28 by using the following data entry procedure:

1. Depress the "ENTER" switch 95.
2. Depress the "FUNCTION" switch 86.
3. Enter the desired function number (15-28) by serially depressing the appropriate digit entry buttons on keyboard 41. The number entered will appear in the "FUNCTION" display 93.
4. Depress the "VALUE" switch 87.
5. Enter the desired value, most significant digit first, by depressing the digit entry buttons. The value will be displayed in the Value Display 94.
6. To store the displayed data, depress and hold the "ENTER" switch 95, then momentarily depress the "STORE" switch 91, while holding the "ENTER" switch 95. Now release the "ENTER" switch. A flashing display 94 indicates the value was not stored because it was out of range or because of improper procedure.
7. Repeat steps 2-6 for all functions 15-28.

The identification number (I.D. number) is meant to provide some measure of protection against unauthorized "tampering" with the stored data. The ID number is also used to select manual or automatic reset operation.

The ID number is the last function to be entered and will not be accepted unless, and until, all other functions have been properly stored into storage memory. Only two numbers will be accepted as valid ID numbers. These are: 51 for manual reset, 85 for automatic reset.

Knowledge of the ID number is required to return the unit to "ACTIVE" status following the change of any stored setpoint.

Prior to the required motor/system data being entered into the random access memory 44, the motor protection device was in the inactive mode. The inactive mode is indicated by the light 96 labeled "INACTIVE" on the front panel being lit and the alarm relay 53 being in the alarm state. The inactive mode means that motor protection is not being provided. When the device is in the inactive mode, the status of the trip alarm relay 55 remains unchanged, i.e., if the trip relay is tripped it remains tripped or if it is not tripped it remains untripped. In addition to the device being in the inactive mode when any of the required motor/system data is not stored in memory it also becomes inactive when, the supply power is lost, any of the stored motor/system data is altered without proper entry of the identification code, or when an internal malfunction of the device is detected. The Inactive light will not be lit when the device is in the inactive mode and there is no power being applied to the device.

The internal malfunction of the device as mentioned above can occur in two ways:

1. The motor protection data stored by the user into RAM Memory 44 is destroyed or lost. The device frequently checks the data which is stored three times in random access memory 44 and if any distortion or loss of data is detected by comparing the data entries, false tripping due to incorrect data will be avoided by assuming the inactive state. The alarm relay will be activated when the device is in the inactive mode. Also, the keyboard and the numerical display will not function and no motor protection is provided until the user restores operation by depressing the special "ENTER" switch 95. This will activate the keyboard and the display functions and also clear the bad data. The user then must check all the data in Functions 15 to 28, enter and store the missing values and finally store the ID number.

2. The processor loses control over its normal operation. The processor normally generates a pulse train to keep the alarm relay in the non-alarm state.

Should the processor unit malfunction and not produce this pulse train, the result would be that the device would assume the alarm state. The inactive light may or may not be on.

The annunciator panel 97 containing the fault indicators 51 located on the front panel consist of six light-emitting diodes labeled Overload, Phase Reversal, Ground Fault, Instantaneous Overcurrent, Phase Unbalance and Bearing, indicate an alarm condition when they are flashing and a fault (trip condition) when a steady indicator signal is given. Flashing overload and bearing lights also indicate an open RTD.

The keyboard 41 on the front panel can be utilized in checking motor conditions. Any function can be examined through the following steps: (1) depress FUNCTION switch 86, (2) enter the Function number in the keyboard 41 and the respective value will appear in the Value Display 94. The display will remain energized for three minutes after the last command is entered through the keyboard. After three minutes, the display will automatically blank in order to prolong display life. Depressing the DISPLAY switch 88 will energize the display for and additional three minutes. The RESET switch 92 is used for manually resetting the device after a trip has occurred. The SCAN switch 90 located on the front panel activates the Scan function. This function provides an automatic, sequential display of the motor conditions that exist in functions 1-11. Unused functions will not be scanned. For example, if no bearing RTD's are used, function 7 and 8 will be omitted from the scan. The Scan function can be halted by depressing the FUNCTION switch.

Any set point stored in the memory can be changed by following the six steps previously discussed for entry of set points. Should any set point (function 15-28) be changed, the ID number will be reset to zero by internal programming. The inactive light 96 will turn on and the alarm relay 53 will be in the alarm state to signal that motor protection has been interrupted. To regain protection, the identification number (function 28) must be stored again into the RAM memory 44.

A flashing display for function members 15 to 27 indicates that a selected value to be entered is outside the limits previously discussed for the various functions. A flashing display for function number 28 indicates one of the following: (1) an invalid ID number is selected; (2) all the set points (function members 15 to 27) are not stored into the storage memory. A flashing display may be stopped by depressing VALUE or FUNCTION buttons.

Phase unbalance (function 23) may be disabled by storing the value 99 for function 23. The device considers an open phase as a special case of phase unbalance; therefore, if the phase unbalance function is disabled, open phase protection is also disabled. Storing function 26 with 1 disables phase reversal protection. Storing function 26 with 2 enables phase reversal protection.

For application where no winding and/or bearing RTD's are used, functions 15 to 18 and function 27 must be selected as follows: (1) if no bearing RTD's are used, function 16 is set to zero and function 18 is set to 130; (2) if no winding RTD's are used, function 15 is set to zero, function 17 is set to 130, and function 27 is set to the desired value (100 to 120% of full load current) of the ultimate trip current.

During a power outage to the motor protection device, no protection is provided; however, a rechargeable battery located inside the motor protection device will retain the user set points stored in the random access memory 44. This permits the motor protection device to begin protection as soon as the power is re-established without having to store all the field settable data again. If some of the data is lost from the memory when the motor protection device is not being supplied power, the device will switch to the inactive mode and the user will have to re-enter the set points before the motor protection can be restored.

The computational portion of the processor 1, the trip relay driver, and the trip relay can be tested by means of a built-in test function. This test artificially simulates a rising winding RTD temperature which will eventually result in actuating the trip relay.

The test will not operate when the device is protecting the motor (the "INACTIVE" indicator light-OFF).

The following procedure is used to perform this test:
1. Check the following:
   a. All of the user data for function number 15 to 28 must be stored into RAM storage memory 44.
   b. All the seven indicator lights (LED's) of panel 97 including the "INACTIVE" light 96 on the front panel must be off.
   c. The alarm relay should not be in the alarm state.
   d. The trip relay should not be in the trip state.
2. Put the device into the Inactive mode by storing 0 into function 28.

The "INACTIVE" light 96 should turn ON. The alarm relay should go to the alarm state.
3. Note the winding RTD trip temperature stored into function 17.

The winding RTD alarm temperature is 10° C. below the trip temperature.
4. Select function number 0.

If the winding RTD's are used (Function 15 is not zero), the Value display 94 will show the prevailing maximum winding RTD temperature.

If the winding RTD's are not used (Function 15 is zero), the Value display 94 will show zero.
5. Depress and hold the VALUE switch 87. The Value display 94 will increase slowly as long as the VALUE switch is held depressed.

If no winding RTD's are used, the Value display 94 will first jump to 40° C. or higher temperature and then increase slowly.
6. When the winding RTD alarm temperature is reached, the OVERLOAD indicator will begin the flash indicating alarm condition.

The alarm relay is already in the alarm state since step 2 above.
7. When the winding RTD trip temperature is reached, the OVERLOAD indicator will come on steady and the trip relay will go to the trip state.
8. If the VALUE switch 87 is held depressed even after the trip temperature is reached, the displayed temperature will eventually reach 199° C. and then roll over to 0° C.
9. Release the VALUE switch 87 and then depress and hold the RESET switch 92.

If winding RTD's are not used, the Value display 94 will jump to zero and the OVERLOAD indicator light will be turned off immediately.

If winding RTD's are used, the maximum winding RTD temperature displayed by the value display 94 will revert to the prevailing value at a controlled rate. The OVERLOAD indicator will turn off when the temperature of 15° C. below the trip temperature is reached.

Even though no trip condition remains and the RESET switch 92 is depressed, the state of the trip relay (tripped) does not change. This is because the protection device is in the Inactive mode (no ID number in function 28 to define reset).
10. Select the desired type of reset by storing appropriate ID number into function 28.

The trip relay should then assume the non-trip state since there is no trip condition present.

The "INACTIVE" indicator light 96 should turn off and the device again assumes protective functions.

All temperature readings are displayed directly in degrees Celsius. The maximum temperatures can be displayed as 199° C. Line currents are displayed as percentage of full load current. The maximum current which can be displayed is 199% of full load current. Ground fault current is displayed as a percentage of the set point. The maximum ground fault current which can be displayed is a 199% of a set point.

A summary of the operation of the various front panel elements of FIG. 3 is provided below:

| Panel Name | Type Element | Function |
| --- | --- | --- |
| FUNCTION | Switch 86 | o Prepare for a new "function" entry. |
| | | o Stops a flashing |

-continued

| Panel Name | Type Element | Function |
|---|---|---|
| Function display 93 | 2-digit read-out | display.<br>o Stops the scan mode<br>Displays the last-entered function number which represents a unique motor parameter. |
| VALUE | Switch 87 | o Prepares for a new data entry for the function whose number (15 to 28) is displayed in the function display. |
| Value display 94 | 2½-digit read-out | Displays the value of the function whose number is displayed in the function display. |
| DISPLAY | Switch 88 | o Energize the Function and Value displays for a 3-minute interval.<br>o Displays the previously entered function and value. |
| SCAN | Switch 90 | o Examines and displays the motor conditions of function numbers 1-11 sequentially. |
| STORE | Switch 91 | o Stores a new acceptable value in the memory.<br>o Initiates a flashing display if the value is out of range. |
| ENTER switch | Switch 95 | Used in conjunction with STORE to enter date into storage memory 44. |
| 0 through 9 | Numerals 85 | Digit entry for the function and Value display. |
| RESET | Switch 92 | Allows the trip relay to be manually reset after a trip has occurred. |
| INACTIVE | Light 96 (LED) | Indicates device is not protecting the motor. |
| OVERLOAD<br>PHASE REVERSAL<br>GROUND FAULT<br>INST. OVERCURRENT<br>PHASE UNBALANCE<br>BEARING | Panel 97 (LED's) | Fault indication - A flashing light signals an alarm condition. A steady indicator light signals a fault (trip) condition. Flashing Overload and BEARING lights also indicate an open RTD. |

Referring to FIG. 1, the processor 1 which may be an Intel 8035, 8-bit chip microcomputer or other suitable processor has a crystal oscillator 45 having a frequency of 5.898 MHz which is used to provide internal timing references for an instruction cycle time of 2.54 microseconds and an internal 8-bit timer interval of 81.38 microseconds per count.

An 8-bit timer of processor 1 is used to generate timer interrupts every 0.016 seconds. To provide various timing references such as 0.25 seconds, 0.5 seconds, 1 second, etc., an 8-bit memory location of processor 1 is used as a system clock. This clock is incremented one count every 0.016 seconds. This clock overflows from 225 counts to zero.

A bus is used to interface the battery powered random access memory 44, latch decoder 40, address latch 39 and latches 46, 47 and 48 with the processor 1. These devices are assigned specific addresses called external addresses which are listed below.

| Hexadecimal Address | | | | |
|---|---|---|---|---|
| F3 | Latch | Column #3 | 4 Bits | (4 keys) |
| F2 | Decoder | Column #2 | 4 Bits | (4 keys) |
| F1 | 40 | Column #1 | 4 Bits | (4 keys KEYBOARD |
| F0 | | Column #0 | 4 Bits | (4 keys) |
| | | Not Used | | |
| E8 | Address Latch 39 | | (4-bit): | Input Selector |
| | | Not Used | | |
| E4 | | Latch 48 | (8-bit): | Annunciator, Alarm, and Trip Signals |
| | | Not Used | | |
| E2 | | Latch 50 | (8-bit): | Value Buffer |
| E1 | | Latch 49 | (8-bit): | Function Buffer |
| | | Not Used | | |
| BF<br>00 | RAM 44 | | 192 × 4 | |

A program storage read-only memory 43 is also connected to the bus and consists of the total of 2,048 8-bit bytes. There are two locations in the program memory 43 of special importance: (1) the first instruction to be executed after initialization (Reset/Power-Up) is stored in location zero (RESET); and (2) the first instruction to be executed after timer interrupt is stored in location 7 (TMRIMT). The processor 1 contains a total of 128 8-bit bytes of resident data memory. Bank 0 working registers are used during the system reset and normal operation. Bank 1 working registers are used during the timer interrupt program. Bank 0 and Bank 1 each contain the eight 8-bit bytes. The resident data memory also has an eight level stack.

The keyboard 41 is read by pulses being provided at one of the 4 outputs of latch decoder 40 which are connected to keyboard 41. The 4 output lines of keyboard 41 indicate which 4 of 16 keys are closed for each 1 of 4 input lines to the keyboard addressed. The keyboard can be checked for key closures and releases, 4 keys at a time.

The tri-state driver 42 is used to connect and disconnect the output of the keyboard to the bus, based on the enable signal received from decoder latch 40. The function numbers entered are stored in resident data memory of processor 1 and displayed. When field settable data is entered, depressing the ENTER switch 95 enables the write function of the read/write enable line of RAM 44 storing the data in RAM 44.

Program memory 44 is a battery powered 192×4 random access memory. This memory is divided into three sections. Each set point or calculated constant is stored three times in the memory, one copy in each section. This makes the contents of section 1, section 2 and section 3 identical. This arrangement provides a check against any undesirable change in the contents of this memory. As was explained earlier, a special procedure is necessary to enter set points into this memory.

Address latch 39 is a four-bit latch which is used to select one of 16 analog input signals from multiplexers 3, 4, 5 and 33. Based on the contents of latch 39, one of the 16 inputs shown below is selected.

| INPUT NUMBER | CONTENT OF LATCH 39 | SELECTED INPUT |
|---|---|---|
| 1 | 0 HEX | WINDING RTD 1 |
| 2 | 1 HEX | WINDING RTD 2 |
| 3 | 2 HEX | WINDING RTD 3 |
| 4 | 3 HEX | WINDING RTD 4 |
| 5 | 4 HEX | WINDING RTD 5 |
| 6 | 5 HEX | WINDING RTD 6 |
| 7 | 6 HEX | BEARING RTD 1 |
| 8 | 7 HEX | BEARING RTD 2 |
| 9 | 8 HEX | PHASE 1 CURRENT (HIGH GAIN) |
| 10 | 9 HEX | PHASE 2 CURRENT (HIGH GAIN) |
| 11 | A HEX | PHASE 3 CURRENT (HIGH GAIN) |
| 12 | B HEX | GROUND FAULT CURRENT |
| 13 | C HEX | PHASE 1 CURRENT (LOW GAIN) |
| 14 | D HEX | PHASE 2 CURRENT (LOW GAIN) |
| 15 | E HEX | PHASE 3 CURRENT (LOW GAIN) |
| 16 | F HEX | INSTANTANEOUS OVERCURRENT |

Up to eight RTD's can be monitored with up to six RTD's (one or two per phase normally) in the windings of the motor. If less than six winding RTD's are used, then the lower number addresses of the multiplexers 3, 4 and 5 are filled first. Up to two bearing RTD's can be connected to the seventh and eighth input of multiplexers 3, 4 and 5.

Multiplexing the RTD's allows a single RTD input bridge circuit 6 to be used. The purpose of the RTD input bridge circuit 6 is to compensate for RTD lead resistance which can introduce significant errors in the RTD resistance readings.

A link 18 is placed in series with the proper value of feedback resistor 17 of the operational amplifier 9 in RTD input bridge circuit 6. The feedback resistor 17 is chosen to correspond with the type of RTD that is going to be used. For example, 10 ohm copper, 100 ohm platinum, 100 ohm nickel, 120 ohm nickel. Only one type of RTD should be used.

When the address latch 39 is connected to the bus by an enable signal received from the decoder latch 40, one of the addresses previously listed is loaded into the latch. If address is below 8 HEX then multiplexers 3, 4 and 5 are enabled while multiplexer 33 is disabled because of the inverter 42 in the most significant bit line feeding the multiplexer 33. Likewise, if the address in latch 39 is above 7 HEX, then multiplexers 3, 4 and 5 will be disabled while multiplexer 33 will be enabled. The second most significant bit line from address latch 39 serves to select the high gain or low gain range of selectable gain amplifier 35a. A logic zero input causes the high gain setting of the amplifier 35a to be chosen while a logical one signal causes the low gain amplification setting of amplifier 35a to be selected.

The voltage output of operational amplifier 9 is proportional to the selected RTD resistance in terms of volts per degree C., independent of the lead resistance.

The three line currents of line $L_1$, $L_2$ and $L_3$ are monitored by current transformers 20, 21 and 22, respectively. Each current transformer is connected to a corresponding isolation transformer 23, 24, 25 which has an output of one volt per amp. The isolation transformers 23, 24, and 25 are connected to corresponding rectifier/filters 26, 27, and 28. The output of rectifier/filter 26 which is associated with line 1 is connected to the first and fifth input of multiplexer 33. The output of rectifier/filter 27 which is associated with line 2 is connected to the second and sixth input of multiplexer 33, and the output of rectifier/filter 28 which is associated with line 3 is connected to the third and seventh input of multiplexer 33.

The analog outputs of the selectable gain amplifier 35a and the analog output of the operational amplifier 9 are coupled to one input of a comparator 37a. The signal available at the comparator 37a is determined by the contents of latch 39. A logic level 1 output from comparator 37a signifies that the analog output of the digital-to-analog converter 38 is more than the measured value input to the comparator 37a. A logic level zero output from the comparator signifies that the analog output from the digital-to-analog converter 38 is less than the measured signal. The output of the comparator 37a is connected to a successive approximation program located in processor 1 which adjusts the digital output fed to the digital-to-analog converter 38 so that the analog value output from the digital-to-analog converter which is fed to one input of the comparator, approaches the measured analog values input to the other input of the comparator 37a. A selectable gain amplifier 35a provides two sets of phase currents, one being the high gain phase currents having a range of zero to 195% full load current which are used for phase unbalance and overload calculations, and the other being the low gain phase currents which provide full range measurements of zero to 152 times full load current and are used for instantaneous overcurrent and overload protection. The 16 inputs are stored in the resident data memory of processor 1.

Phase reversal information is provided by the output of NAND gate 64 to processor 1. Two flip-flops 58 and 59 are used. Flip-flop 58 is clocked by line 2 and steered by the other two lines ($L_1$ and $L_3$) while flip-flop 59 is clocked by line 3 and steered by the other two lines ($L_1$ and $L_2$). Should the phase sequence reverse the flip-flops 58 and 59 will no longer stay in the proper state (which results in a logic level "0" output from NAND gate 64), rather the output of NAND gate 64 will go high indicating a phase reversal.

The software used by the motor protection device will now be discussed. The software for the motor protection device is organized in the following functional categories:
1. Current and Temperature Inputs.
2. Keyboard and Display Functions.
3. Protection Functions.
4. Annunciator, Alarm and Trip Outputs.
5. General Purpose Subroutines.

Each of these functional categories is broken down into several program subroutines. The current and temperature input related functions are organized in the following categories:
1. Analog to digital (A/D) conversions (ANALOGI).
2. The maximum value of phase currents (MAXLOG).
3. The maximum values of RTD temperatures (MAXRTD).

The A/D conversion of the sixteen current and temperature inputs is performed by the successive approximation method. Each analog input signal is selected for the A/D conversion as previously described. After performing the A/D conversion, the digital data is stored into the assigned data memory (RAM) location in the resident data memory of processor 1. After each RTD input signal is selected, time delay of 0.016 second is required before the A/D conversion can be performed. To satisfy this requirement, the program is executed once every 0.016 second time interval.

The following scale is used in storing the 16 temperature and current inputs.

| INPUT NUMBER | INPUT DATA | SCALE |
|---|---|---|
| 1 | WINDING RTD1 TEMP. | 1.28 COUNT = 1° C. |
| 2 | WINDING RTD2 TEMP. | 1.28 COUNT = 1° C. |
| 3 | WINDING RTD3 TEMP. | 1.28 COUNT = 1° C. |
| 4 | WINDING RTD4 TEMP. | 1.28 COUNT = 1° C. |
| 5 | WINDING RTD5 TEMP. | 1.28 COUNT = 1° C. |
| 6 | WINDING RTD6 TEMP. | 1.28 COUNT = 1° C. |
| 7 | BEARING RTD1 TEMP. | 1.28 COUNT = 1° C. |
| 8 | BEARING RTD2 TEMP. | 1.28 COUNT = 1° C. |
| 9 | PHASE1 CURRENT (HIGH GAIN) | 128 COUNTS = 5A |
| 10 | PHASE2 CURRENT (HIGH GAIN) | 128 COUNTS = 5A |
| 11 | PHASE3 CURRENT (HIGH GAIN) | 128 COUNTS = 5A |
| 12 | GROUND FAULT CURRENT | 255 COUNTS = 1A |
| 13 | PHASE1 CURRENT (LOW GAIN) | 16.7 COUNTS = 5A |
| 14 | PHASE2 CURRENT (LOW GAIN) | 16.7 COUNTS = 5A |
| 15 | PHASE3 CURRENT (LOW GAIN) | 16.7 COUNTS = 5A |
| 16 | INSTANTANEOUS OVERCURRENT | 16.7 COUNTS = 5A |

A digital filter is provided by the software for the maximum value of the low gain phase current inputs. The new maximum value can only be a few counts higher or lower than the old maximum value, i.e., OLD MAX. $-4$ COUNTS $\leq$ NEW MAX. $\leq$ OLD MAX. $+4$ COUNTS To provide this digital filter, the maximum value of phase currents (MAXLOG) program is executed once every 0.016 second interval.

The device uses the maximum values of the winding and the bearing RTD temperature inputs to provide protection functions, rather than individual RTD temperatures. Digital filters are provided for the maximum values of the winding and the bearing RTD temperatures so that:

OLD MAX $-1$ COUNT $\leq$ NEW MAX $\leq$ OLD MAX $+1$ COUNT

To provide these digital filters, the maximum values of RTD temperatures (MAXRTD) program is executed once every 0.256 second interval. The user stores the number of winding RTD's used in Function No. 15 and the number of bearing RTD's used in Function No. 16. This information is used to determine the maximum RTD temperatures. The MAXRTD program also determines the following modes of operation.
1. No winding RTD's (NOWRTD).
2. Open winding RTD (OPNWND).
3. Open bearing RTD (OPNBRD).

Figure 4A:
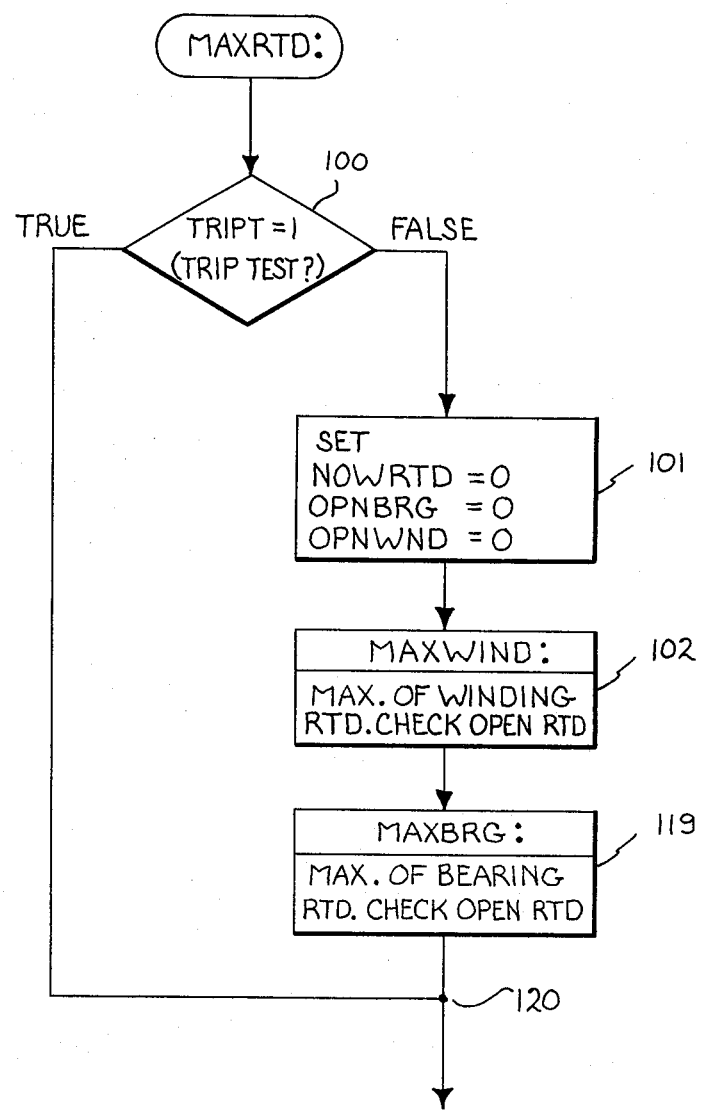
FIG. 4 is a flow chart showing the Maximum Values of RTD Temperatures program in accordance with the present invention.
Figure 4:
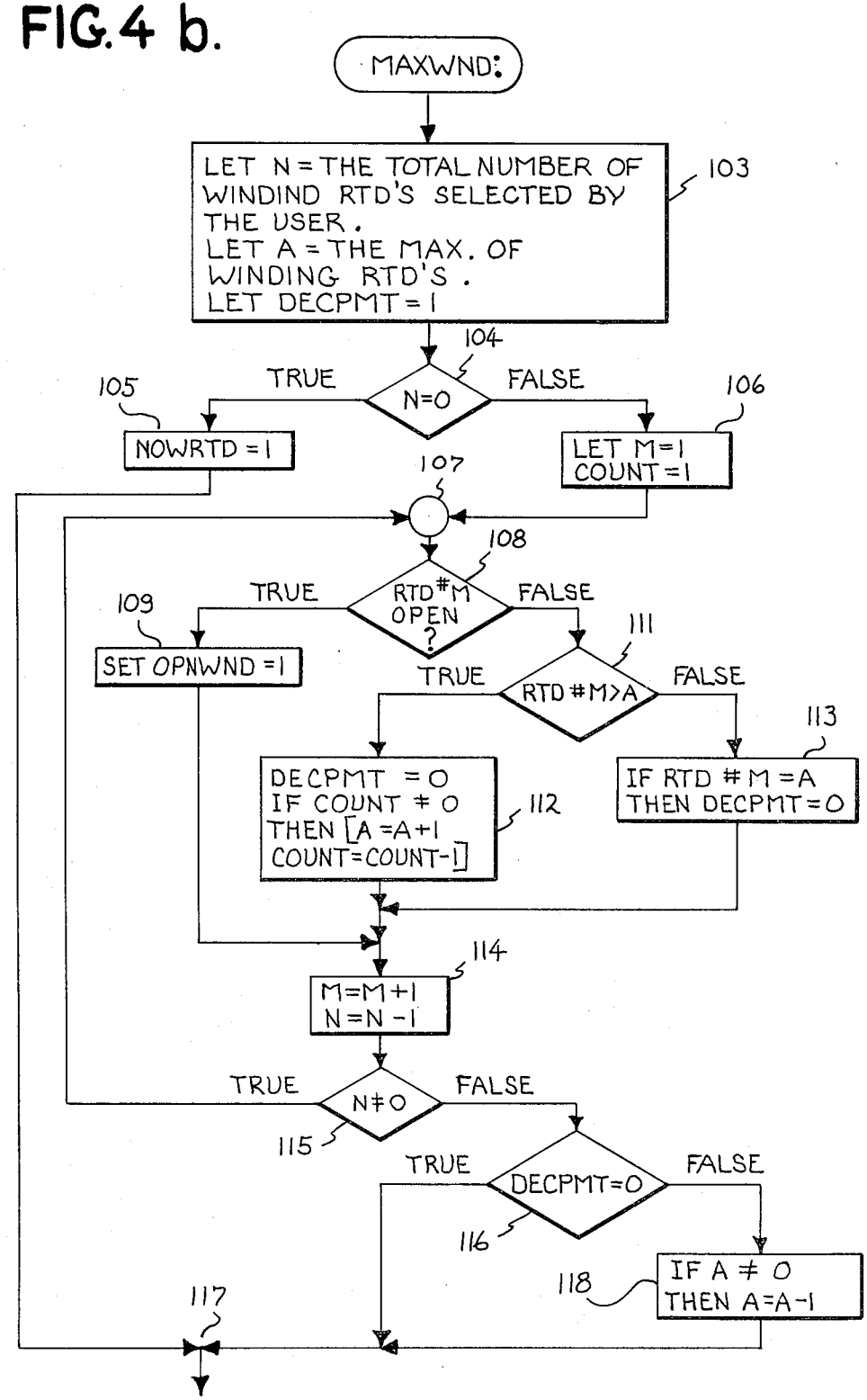

Each mode is represented by one bit message called a flag. A logic level 0 means that the message is false. A logic level 1 means that the message is true. Referring now to FIG. 4 the MAXRTD flow chart is shown. The first block of the MAXRTD flow chart is decision block 100. Here a check is made to see if the trip test flag (TRIPT) is equal to 1. If the flag is equal to 1, it would mean that a trip test is being conducted. If the flag is equal to zero, then a trip test is not being conducted. If a trip test is going on, then block 100 is connected to node 120 at the end of the MAXRTD program since no bearing or winding input calculations is to be made. Winding temperatures will be simulated elsewhere for test purposes. If a trip test is not going on, then block 100 is connected to subroutine block 101 which sets the no winding RTD flag (NOWRTD), open bearing flag (OPNBRG) and the open winding flag (OPNWD) all equal to 0. Block 101 is connected to the maximum bearing temperature (MAXBRG) subroutine block 102. Block 102 is shown in greater detail starting with subroutine block 103. In block 103 N is set equal to the number of RTD's selected by the user, A is set equal to the maximum of winding RTD's and the decrement flag (DECPMT) is set equal to 1. Block 103 is connected to decision block 104 where if no winding RTD's were selected to be monitored by the user, block 104 is connected to subroutine 105. Block 105 sets the no winding RTD flag equal to 1 or, in other words, true. Block 105 is connected to node 117. If the number of winding RTD's selected by the user is not equal to 0, then block 104 is connected to subroutine block 106 which sets M equal to 1 and count equal to 1. Block 106 is connected to loop connecting node 107. Node 107 is connected to condition block 108. The Mth RTD is checked to see if it is equal to 199.22° C. (255 counts) and if the Mth RTD is equal to 199.22° C., it is open. If the RTD is open, block 108 is connected to subroutine block 109 which sets the open winding RTD flag (OPNWND) equal to 1. Block 109 is connected to decision connecting node 110. If the Mth RTD is not open, then block 108 is connected to condition block 111.

Condition block checks if the Mth RTD is greater than the previous maximum RTD. If this condition is true, then block 111 is connected to subroutine block 112. Block 112 sets the decrement flag (DECPMT) equal to 0 and if COUNT is not equal to 0 then the previous maximum RTD is increased by one count and count is set equal to 0 to allow only one decrement for each check of N winding RTD's. Block 112 is connected to node 110. If the condition of block 111 is false, then block 111 is connected to subroutine block 113. In block 113 if the Mth RTD is equal to the previous maximum, then the decrement flag is set equal to 0. Block 113 is connected to node 110. Node 110 is connected to subroutine block 114. The RTD to be checked is increased by one and the number of RTD's to be checked is decreased by one. Block 114 is connected to condition block 115. Block 115 checks if all the RTD's have been checked. If there are RTD's left to be checked, block 115 is connected to node 107. If all the RTD's have been checked block 115 is connected to condition block 116. In block 116 the decrement flag is checked to see whether or not it has been set to 0. If the flag has been set to 0, then the previous maximum winding RTD has been incremented and block 116 is connected to node 117 at the end of the MAXWND subroutine. If the decrement flag is equal to 1, then the N RTD's checked were not equal to or greater than the previous maximum. Block 116 is connected to subroutine block 118. In block 118 if the previous maximum winding RTD is not 0, it is reduced by one count. Block 118 is connected to node 117.

Node 117 is connected to subroutine block 119. Block 119 contains the maximum bearing RTD (MAXBRG) subroutine which is similar to the maximum winding subroutine just described. Block 119 is connected to node 120 at the end of the maximum RTD program.

The Keyboard and Display Functions will now be discussed. The primary function of the 16-key keyboard and the numerical displays (Function and Value) is to enable the user to store the motor and system data (setpoints) into RAM 44. However, using the keyboard, various measure currents and temperatures are also displayed. The functions performed are organized in the following three programs:
1. Receive commands and data from the keyboard (KYBORD).
2. Prepare Function and Value data for display (UPDART).
3. Display the Function and Value data (DISPLY).

The user gives a command using one of the six command keys (Function, Value, Store, Scan, Reset, and Display). The user enters a digit using one of the ten number keys (0 to 9). The KYBORD program is executed once every 0.016 second interval to help provide adequate time delay for a bouncing key. Two successive key closure detections, 0.016 second apart, are required before a key entry is accepted. Also two successive key release detections, 0.016 second apart, are required before a new key entry is accepted.

The Prepare Function and Value Data for Display (UPDATE) program will now be discussed. Depending on which mode of operation is selected by the user using the keyboard, this program determines what data should be displayed. When the scan mode is selected (SCAN=1), function numbers 1 to 11 are selected for display at regular interval of 4 seconds. Of course, the unused RTD temperatures are skipped in this process. Depending on which function number is selected, corresponding value data is prepared for the display. When any one of the RTD temperature function numbers (0 to 8) is selected, the corresponding value data prepared for display is in °C. When any one of the three phase current function numbers (9, 10, 11) is selected, the corresponding value data prepared for display is in percent of full-load-current (FLC). When the ground fault current function number 12 is selected, the value data prepared for display is in the percent of the ground fault trip current.

The values stored in the user data memory RAM 44 for the setpoints (Functions 15 to 29) are in binary. When one of the setpoint function numbers is selected, the corresponding value data prepared for display is in the three digit BCD value. The function number data prepared is two BCD digits and the value data prepared is three BCD digits. The UPDATE program is executed once every 0.256 second. The three minutes display timer is decremented once every second.

The Display the Function and Value Data (DISPLY) program sends the function and the value data for display. This program is executed once every 0.016 second interval. If the flashing display mode is active (FLASH=1), the flashing display is generated. If the three minutes display timer has timed-out, the display is blanked. The leading zeros in the function number and the value data are blanked, i.e. instead of 01, 1 is displayed.

Whenever the user stores a setpoint (Functions 15 to 29), a set of constants is calculated based on the data stored by the user. These calculated constants are then stored in the RAM 44.

The constants must be stored at this time since the write enable line of RAM 44 can only be enabled externally by the enter switch.

The following protection functions are performed:
1. Overload/Overtemperature protection (CUTEMP, OVRLOD).
2. Bearing Overtemperature protection (OVTBRG).
3. Ground fault protection (GFAULT).
4. Phase Unbalance protection (PHAUNB, PUNBAL).
5. Phase Reversal protection (PHAREV).
6. Instantaneous Overcurrent protection (INSTOC).

The necessary functions to provide the overload-/overtemperature are organized in the following two programs.
1. Calculations for the copper winding temperature (CUTEMP).
2. Determination of Overload Alarm and Trip conditions (OVRLOD).

Two separate calculations for the copper-winding temperature (CUTEMP) are made depending on whether winding RTD's are used or not.

When the winding RTD's are used, the calculations are based on the RTD model and when the winding RTD's are not used, the calculations are based on the non-RTD model. When the winding RTD's are not used, the user store 0 into Function 15 which in turn selects the non-RTD model. Otherwise, the RTD model is selected. The copper temperature calculations assume Class B insulation, i.e. the trip temperature of 180° C. The CUTEMP program is executed once every 0.256 second. One data memory (RAM) location in the processor contains the RTD temperature (1.28 count=1° C.) which is used to calculate the copper temperature. When the winding RTD's are used, this temperature is the maximum of the winding RTD temperatures, otherwise, it is the calculated RTD temperature.

Figure 5:
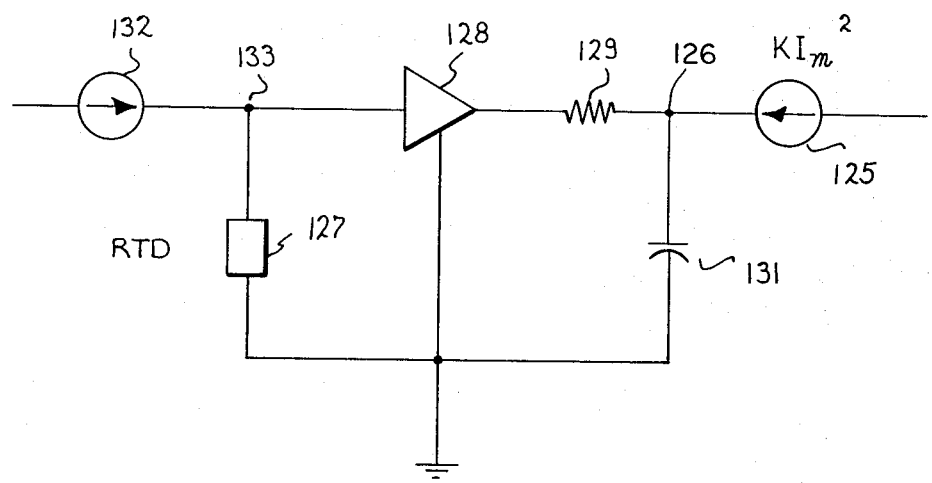
FIG. 5 is a schematic block diagram showing the RTD thermal analog model.

When the winding RTD's are used, the model shown in FIG. 5 is used. FIG. 5 has a current source 125 equal to $KI_m^2$ connected to a node 126. A maximum RTD value 127 is connected to an input of amplifier 128. A resistor 129 is connected between node 126 and the output of amplifier 128. A capacitor 131 is connected between node 126 and ground. Amplifier 128 provides a current path to ground. A constant current source 132 is connected to a node 133.

The output of amplifier 128 is proportional to the maximum RTD winding temperature. The voltage at node 126 is proportional to the motor copper winding temperature.

$$I = KI_M^2 = C\frac{dCU}{dt} + \frac{CU - RTD}{R}$$

where
K is a constant.
$I_M$ is the maximum value of the phase currents, in per unit (P.U.).
CU is the copper winding temperature.
RTD is the maximum winding RTD temperature.
RC is the thermal time constant between the copper windings and the RTD.
If we apply the boundary condition:

$$CU = CUO$$

when t=0 where CUO is the previous value of copper winding temperature then we have the solution.

$$CU = (KRI_M^2 + RTD)(1 - e)^{-t/RC} + e^{-t/RC} CUO$$

To simplify this formula, the following two assumptions are made:
1. t=0.256 second
   This implies that the copper temperature calculations are made every 0.256 second.
2. RC=65.4 seconds
   The RC time-constants for many motors is between 30 to 60 seconds. So this time constant will slightly over protect the motor.
Substituting these values into the copper temperature formula, we get:

$$CU = (KRI_M^2 + RTD)/256 + 0.996CUO$$

This formula is used to calculate the present value of the copper temperature (CU) from the previous value of the copper temperature (CUO) during an overload condition. When the maximum value of the phase currents $(I_M)$ is equal to or greater than 1.95 P.U. (195% FLC) it is defined as the overload condition. For the lesser value of the current, it is defined as the steady-state condition. The constant KR in the copper temperature formula is called the RTD model calibration constant.

The user stores, in Functions 20 and 21, the value of locked-rotor current and the stall time respectively. The value of the calibration constant is determined based on this information using the following formula for Class B insulation:

$$KR = (80 + 8871/\text{STALL TIME})/(\text{LOCKED ROTOR CURRENT})^2$$

When the maximum phase current $(I_M)$ is less than 1.95 P.U. (195% FLC), it is defined as the steady-state condition for the RTD model. For this condition, the copper temperature formula is modified as follows:

$$CU = (10I_M + RTD)/256 + 0.996CUO$$

This gives the coppper temperature a few degrees (0° to 19° C.) higher than the RTD temperature during the steady-state condition. This modification of the original copper temperature formula prevents nuisance tripping during moderate overloads and cyclic loading. In this region of operation, the device relies on the RTD temperature to cause a trip.

When the winding RTD's are not used, the following three calculations are involved with the non-RTD case:
1. The RTD temperature.
2. The copper temperature for overload.
3. The copper temperature for steady-state.

Since the winding RTD's are not used, the RTD temperature is calculated based on the motor current $(I_M)$. Every 65 seconds, a new value of the RTD temperature is determined which is either 2.34° C. higher or 0.78° C. lower than the previous value of the RTD temperature.

One data memory (RAM) location in the processor is used to determine 65 seconds time interval (0.256 second per count). One reference temperature (REFTMP) is calculated using the following formula:

$$REFTMP = 40° C. + (I_M\%FLC)/2.56° C.$$

or $$REFTMP = (105 + I_M\%FLC)/2 \text{ counts}$$

where $0 \leq I_M \%FLC \leq 100$.

If the reference temperature is lower than the previous RTD temperature then the new RTD temperature is 0.78° C. lower, otherwise it is 2.34° C. higher than the previous RTD temperature.

The user stores in Function 27 a value (100 to 120%) of ultimate trip current. This value of the ultimate trip current is used to define an overload or a steady-state condition.

When the maximum value of the motor current $(I_M)$ is equal to or greater than the ultimate trip current, it is considered as an overload condition. Otherwise, it is considered a steady-state condition. For this non-RTD model overload condition, simple $I^2t$ curves are generated using the following formula:

$$CU = (KR\ I_M^2 + RTD)/256 + CUO$$

where
CU is the calculated copper temperature.
CUO is the copper temperature at t=o,
$I_M$ is the maximum value of the motor current,
RTD is the calculated RTD temperature.
KR is the calibration constant, given by the formula.

$$KR = (8960/\text{STALL TIME})/(\text{LOCKED ROTOR CURRENT})^2$$

The user selects the value (1.0 to 1.2 P.U.) of ultimate trip current using Function No. 27. When the maximum phase current $(I_M)$ is less than the selected ultimate trip current, it is defined as the steady-state condition. For this condition, the copper temperature formula is modified as follows:

$$CU = (10 \times I_M + RTD)/256 + 0.996 CUO$$

Note that this is the same formula as the RTD model for the steady-state condition.

The following two programs determine the overload alarm and trip conditions (OVRLOD):
1. The Copper Temperature Alarm and Trip (OVLCUT).
2. The Winding RTD Temperature Alarm and Trip (OVLWND).

The Copper Temperature Alarm and Trip (OVLCUT) program will now be discussed. A data memory (RAM) location of processor contains the value of calculated copper temperature in °C.
The trip temperature is 180° C.
The alarm temperature is 170° C.
The reset temperature is 165° C.
Two one bit flags, CUTALM and CUTTRIP, are used to reflect the determined alarm and trip conditions respectively. If there is the alarm condition, the CUTALM bit is set (CUTALM=1); otherwise it is cleared (CUTALM=0). If there is the trip condition, the CUTRIP bit is set (CUTRIP=1); otherwise it is cleared (CUTRIP=0).

The Winding RTD Temperature Alarm and Trip (OVLWND) program has a data memory (RAM) location in processor that contains the RTD temperature (1.28 count=1° C.). Depending upon whether the winding RTD's are used or not, this temperature is either the maximum temperature of the winding RTD's or the calculated RTD temperature respectively.

Function 17 contains the value of winding RTD trip temperature (20° to 155° C.). Based on this information, the winding RTD trip temperature counts (WRTDT): WRTDT=1.28×(Function 17) are calculated and stored into RAM 44 by the KYBORD program at the time when the user stored the setpoints. The trip temperature constant WRTDT and the RDT temperature in the RAM in this processor have the same scale (1.28 count=1° C.). This makes it easier to compare them and determine the alarm and trip conditions.

| | |
|---|---|
| The trip temperature | = WRTDT counts |
| The alarm temperature | = (Trip Temperature - 10° C.) |
| | = (WRTDT - 13) counts |
| The reset temperature | = (Trip Temperature - 15° C.) |
| | = (WRTDT - 19) counts |

There are two one bit flags, WNDALM and WNDTRP, which are used to reflect the determined alarm and trip conditions respectively. If there is the alarm condition, the WNDALM bit is set (WNDALM=1); otherwise it is cleared (WNDALM=0).

The Bearing Overtemperature Protection (OVTBRG) uses a data memory (RAM) location in processor that contains the maximum temperature of the bearing RTD's (1.28 count=1° C.). For the comparison purpose this temperature is converted in to °C. by dividing the counts by 1.28. Function 18 contains the bearing RTD trip temperature (20° to 155° C.).
The alarm temperature=The trip temperature−10° C.
The reset temperature=The trip temperature−15° C.

There are two one bit flags, BRGALM and BRGTRP, which are used to reflect the determined alarm and trip conditions respectively. If there is the alarm condition, the BRGALM bit is set (BRGALM=1); otherwise, it is cleared (BRGALM=0). The bearing alarm condition caused by an open bearing RTD (OPNBRG) is determined by the OUTPUT program.

The Ground Fault Protection (GFAULT) program uses a data memory (RAM) location in the processor which contains the measured value of the ground fault current (255 counts=1 Amp). The Function 24 contains the ground fault trip current in % of 1 Amp. Multiplying this value by 2.55, we get the ground fault trip current in counts. 76% of the trip value is the ground fault alarm current. The ground fault reset current is 4 counts less than the ground fault alarm current.

There are two one-bit flags, GFALRM and GFTRIP, which are used to reflect the determined alarm and trip conditions respectively. If there is the alarm condition, the GFALARM bit is set (GFALRM=1); otherwise, it is cleared (GFALRM=0).

If there is the trip condition, it is necessary that the trip condition must exist at least for the time interval (time delay) selected by the user in Function 25. To determine this time delay one data memory (RAM) location in the processor is used as the ground fault timer (GFTIME: 1, count=0.016 second). After the ground fault time delay, if there is the trip condition, the GFTRIP bit is set (GFTRIP=1); otherwise, it is cleared (GFTRIP=0).

The phase unbalance protection functions are organized in the following two programs:
1. Phase unbalance calculations (PHAUNB).
2. Phase unbalance alarm and trip (PUNBAL).

Calculations are made to calculate the phase unbalance level (V):

$$0 \leq V \leq 255$$

which will be used to determine the phase unbalance alarm and trip conditions. One data memory (RAM) location in the processor is assigned to store the calculated phase unbalance level (V). At the time of the system initialization (power-up/reset), V=0 is stored.

The PHAUNB program is executed once every 0.256 second.
1. The minimum value of the three phase currents ($I_{MIN}$) is found.
   If the $I_{MIN} \geq 150\%$ FLC then there is no phase unbalance. Then the value of V is decremented by 1 count and no further calculations are made for V.
   If this situation prevails for some time, V will decrease from 255 to 0 in about 255×0.256=65 seconds.
2. If the $I_{MIN} \leq 150\%$ FLC, then the maximum value of the three phase currents ($I_{MAX}$) is found.
   If $I_{MAX} > 150\%$ FLC then $I_{MAX} = 150\%$ FLC is assumed.
3. The phase difference ($I_{MAX} - I_{MIN}$) is found.
4. The normalized phase unbalance (U) is determined by the following formula.

$$U = (I_{MAX} - I_{MIN}) \times K$$

where K=(100/FLC)/(PHASE UNBALANCE SETPOINT)
5. If $U \geq 1$ then it is defined as the phase unbalance condition, otherwise it is not unbalance condition.

6. If there is the phase unbalance condition then $$V = V + U^2 \quad (1 \leq U^2 \leq 255)$$

7. If there is no phase unbalance condition (U<1), then the phase unbalance reference level (REFLEV) is calculated by the following formula:

$$REFLEV = 256 \times U$$

8. If REFLEV<V then the value of V is decremented by 1 count.
9. If REFLEV>V then the value of V is incremented by 1 count.

V=255 counts is defined as the phase unbalance trip level.
When there is a phase unbalance condition ($1 \leq U \leq 15$), i.e. the measured phase unbalance is equal to or greater then the selected phase unbalance trip current in Function 23; then the phase unbalance trip characteristic can approximately be represented by the following formula:

$$\text{Trip-Time } t = 64/U^2$$

where $1 \leq U \leq 15$.
When there is no phase unbalance ($0 \leq U \leq 1$), the phase unbalance level V will reach the level given by the following formula:

$$V = 256 \times U$$

where $0 \leq U \leq 1$.
To reach this level, the value of V is incremented or decremented only by 1 count per 0.256 second.

Figure 6:
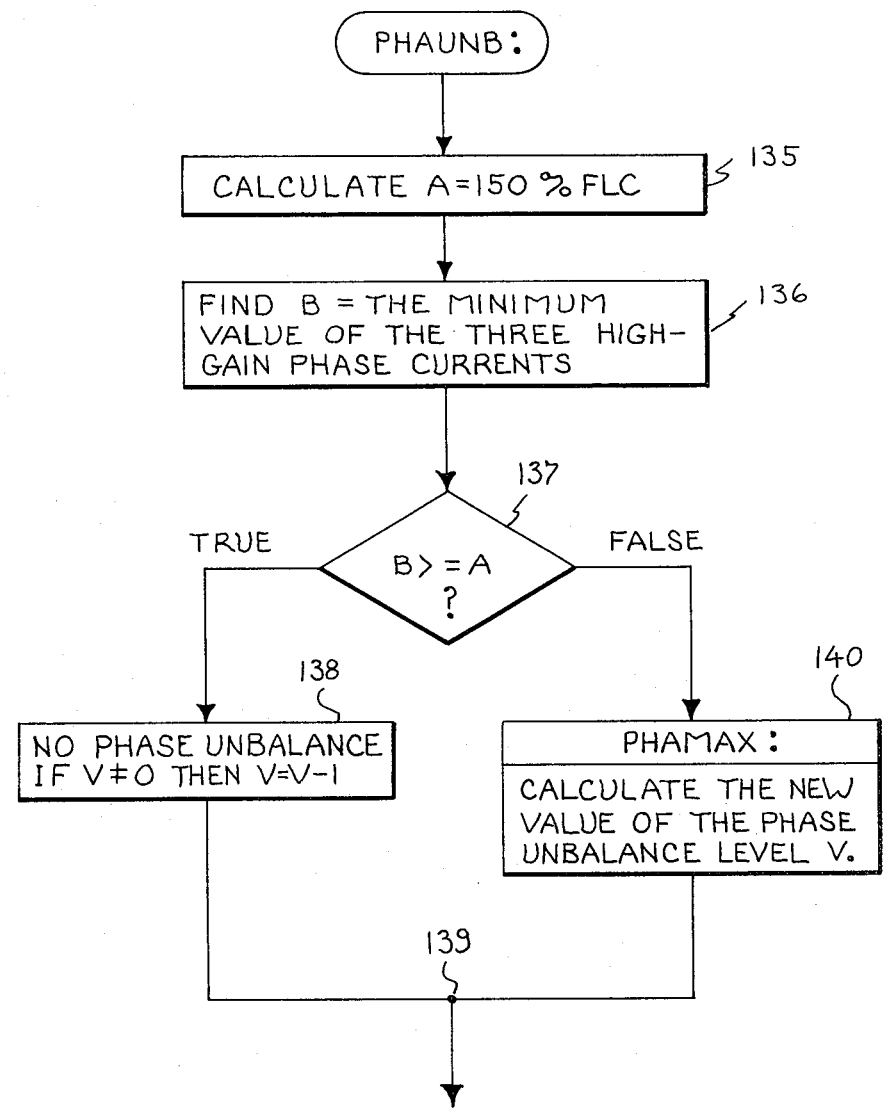
FIG. 6 is a flow chart showing the Phase Unbalance program in accordance with the present invention.
Figure 6:
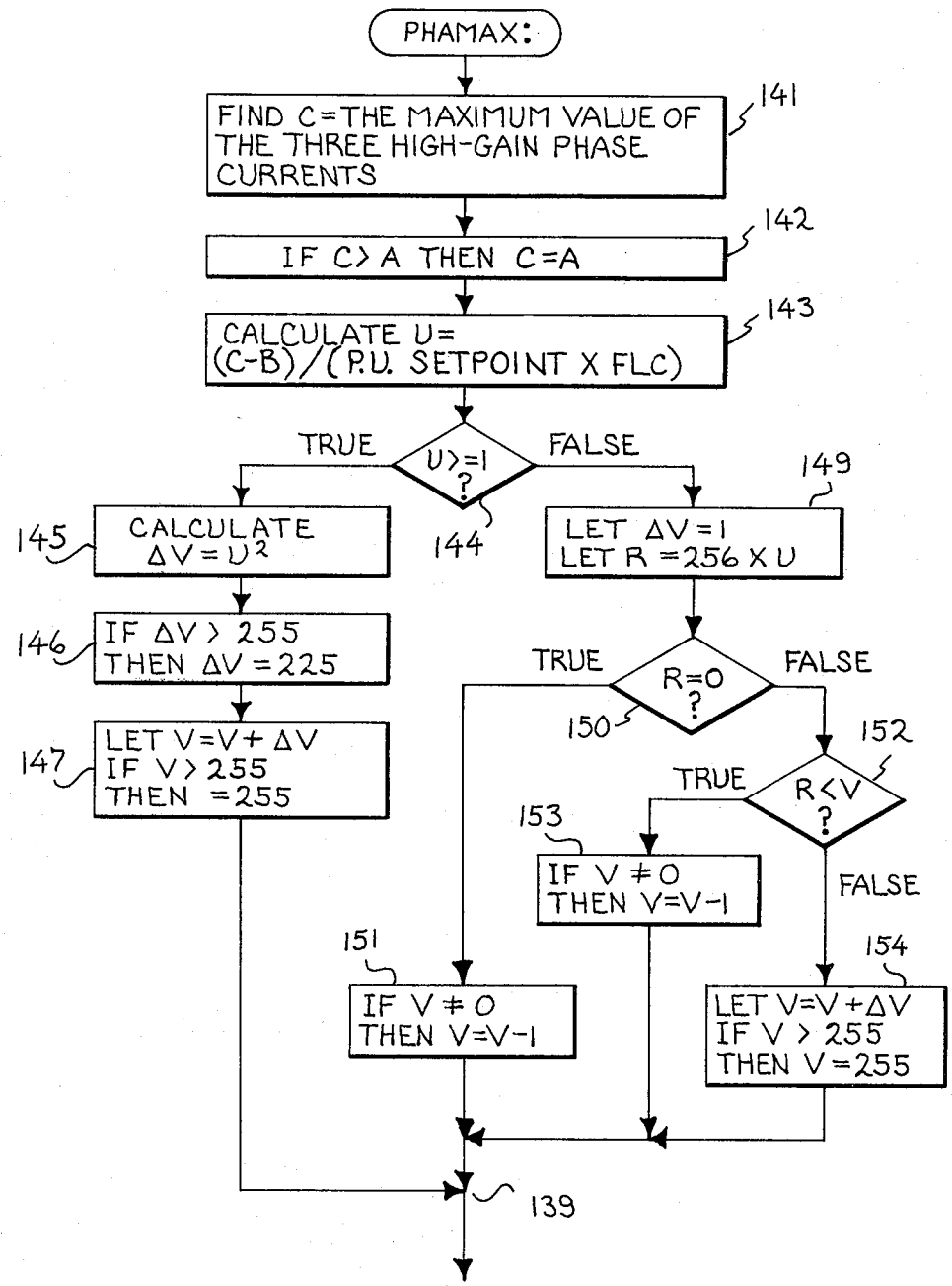

Referring to FIG. 6 the flow chart for the Phase Unbalance Calculations (PHAUNB) is shown.

The first subroutine block 135 of the flow chart is to set A equal to 150% of full load current. Block 135 is connected to subroutine block 136. Block 136 sets B equal to the minimum value of the three high gain phase currents. Block 136 is connected to condition block 137. Block 137 checks if B is greater than or equal to A. If B is greater than or equal to A, then there is no phase unbalance and block 137 is connected to subroutine block 138 which reduces V by one count if it is not already 0. Block 138 is connected to node 139 at the end of the phase unbalance calculation program. If B is not greater than or equal to A, then block 137 is connected to subroutine block 140. Block 140 contains the phase maximum subroutine which is shown in greater detail in the Figure starting with subroutine block 141.

In block 141, C is set equal to the maximum value of the three high-gain phase currents. Block 141 is connected to block 142. If the maximum value of the three high gain phase currents is greater than 150% of full load current (FLC), then the maximum value of the three high gain currents is set equal to 150% FLC. Block 142 is connected to subroutine block 143 where U is calculated as equal to the maximum of the three high gain currents minus the minimum of the phase currents divided by the unbalance current trip point. The unbalance current trip point is determined by multiplying the percent phase unbalance stored by the user by the full load current.

Block 143 is connected to condition block 144. If U is greater than or equal to 1, then block 144 is connected to subprogram block 145. In block 145, ΔV is set equal to U². Block 145 is connected to subroutine blocks 146 and 147 where, if ΔV is greater than 255, ΔV is set equal to 255. Block 147 is connected to node 139. If U is not greater than or equal to 1, then block 144 is connected to subroutine block 149. Block 149 sets ΔV=1 and R equal to 256 multiplied by U. Block 149 is connected to condition block 150. Block 150 checks if R is equal to 0. If R is equal to zero, then block 150 is connected to block 151. Block 151 lowers V by one count if it is not already 0 since there isn't any phase unbalance. Block 151 is connected to node 148. If R is not equal to 0, then block 150 is connected to condition block 152. Block 152 checks if R is less than V; then block 152 is connected to subroutine block 153. Block 153 reduces V by one count if it is not already 0. If R is not less than V, then block 152 is connected to block 154. Block 154 increments V by one count. If V is greater than 255, then V is set equal to 255. Block 154 is connected to node 139.

The phase unbalance alarm and trip conditions (PUNBAL) are determined by checking the phase unbalance level (V) stored in the data memory (RAM) and the process unbalance level (V) stored in the data memory (RAM) in the processor.

V=255 counts is the trip level.
V=171 counts is the alarm level.
(The alarm level is 67% of the trip level)
V=128 is the reset level.

Figure 7:
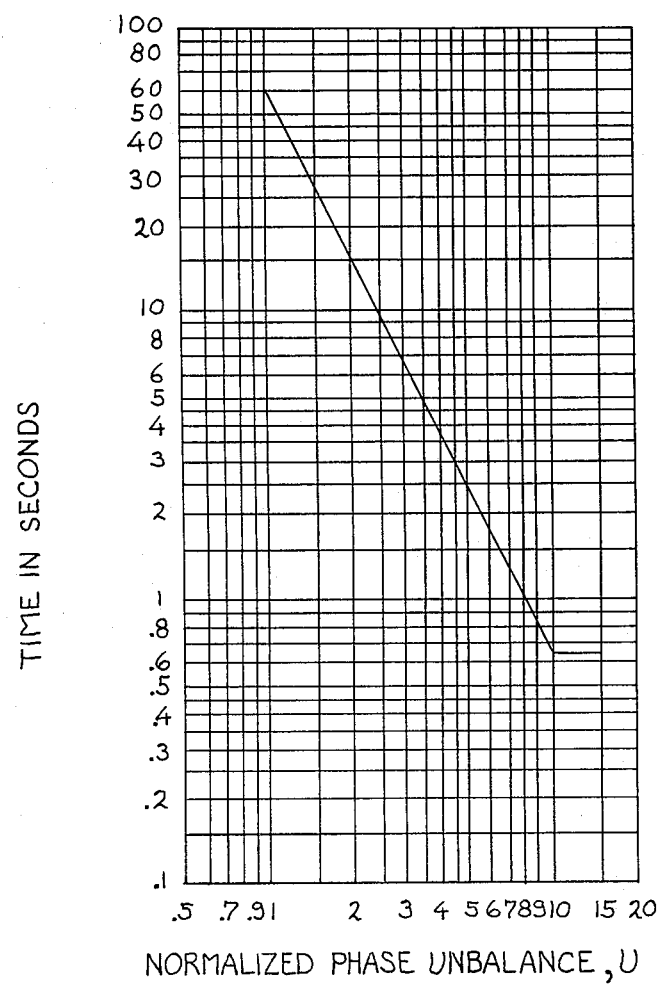
FIG. 7 is a chart showing the Phase Unbalance Trip Characteristic.

The phase unbalance trip characteristics is shown in FIG. 7. Two one-bit flags, PUALRM and PUTRIP, are used to reflect the determined alarm and trip conditions respectively. If Function 23 contains the disable phase unbalance protection code (99), then both the flags are cleared (PUALRM=0 and PUTRIP=0). Then neither the alarm nor the trip will take place. If the disable code (99) is not stored, then the alarm and trip conditions are determined. If there is the alarm condition, the PUALRM bit is set (PUALRM=1); otherwise it is cleared (PUALRM=0). If there is the trip condition, the PUTRIP bit is set (PUTRIP=1); otherwise it is cleared (PUTRIP=0).

The user has an option to select the phase reversal protection. When the phase reversal protection is selected, the enable code (2) is stored in Function 26. To disable this protection, the disable code (1) is stored. As described previously, the phase reversed test input T1 indicates whether the phase reversal condition is detected (T1=1) or not (T1=0) by the hardware. The phase reversal trip condition is said to exist when "the phase reversal Input T1=1 and the maximum value of the three phase currents is at least 50% FLC" for 0.24 second. To determine this 0.24 second time delay, one data memory (RAM) location in the processor is used as the phase reversal timer. Presetting this timer to 15 counts (0.016 seconds per count) generates the required time delay of 0.24 second. One one-bit flag: PRTRIP is used to reflect the determined trip condition. There is no alarm condition for this protection function. PRTRIP=1 for the trip condition.

Instantaneous Overcurrent Protection (INSTOC) uses one data memory location in the processor which contains the measured value of the instantaneous overcurrent in counts (16.7 counts=5 Amp). Function 22 contains the trip value (3 to 20×FLC) selected by the user. Based on this data, the instantaneous overcurrent trip value in counts (IOCTRP):IOCTRP=(Function 22)×(Function 19)/6 is calculated and stored by the KYBORD program at the time when the user stored the setpoints. Thus, the IOCTRP and the measured value both have the same units (16.7 counts=5 Amp).

So it is easier to compare them to determine the trip condition. One one-bit flag IOCTRP is used to reflect the determined trip condition. IOCTRP=1 for the trip condition. There is no alarm condition for this protection function.

The Annunciator, Alarm and Trip Outputs (OUTPUT) program prepares and sends to Latch 48, the fault indicator signals, the annunciator alarm and the alarm and trip relay signals.

There are six fault indicator signals:
1. OVERLOAD
2. BEARING
3. GROUND FAULT
4. PHASE UNBALANCE
5. PHASE REVERSAL
6. OVERCURRENT When any of these signals is logic 1, the corresponding light turns on; otherwise, it turns off. To provide the flashing indicator for an alarm condition, logic 1 is maintained for half-second and logic 0 is maintained for half-second. During a trip condition, the indicator stays on.

OVERLOAD Signal reflects the following five conditions:
1. OPNWND: Open winding RTD alarm condition.
2. WNDALM: Alarm condition due to the winding RTD temperature.
3. CUTALM: Alarm condition due to the calculated copper temperature.
4. WNDTRP: Trip condition due to the winding RTD temperature.
5. CUTRIP: Trip condition due to the calculated copper temperature.

BEARING Signal reflects the following three conditions:
1. OPNBRG: Open bearing RTD alarm condition.
2. BRGALM: Alarm condition due to the bearing RTD temperature.
3. BOTTRP: Trip condition due to the bearing RTD temperature.

GROUND FAULT Signal reflects the following two conditions:
1. GFALRM: Alarm condition due to the ground fault current.
2. GFTRIP: Trip condition due to the ground fault current.

PHASE UNBALANCE Signal reflects the following two conditions:
1. PUALRM: Alarm condition due to the phase unbalance.
2. PUTRIP: Trip condition due to the phase unbalance.

PHASE REVERSAL Signal reflects the trip condition due to the phase reversal (PRTRIP).

OVERCURRENT Signal reflects the trip condition due to the instantaneous overcurrent (IOCTRP).

There are following two signals for the relay drivers.
1. ALMPLS: For the alarm relay.
2. TRIP: For the trip relay.

The ALMPLS signal reflects on alarm condition due to any of the protection function. During an alarm condition this signal is maintained logic 1; otherwise, this signal is pulsing. This arrangement provides the watchdog timer type action for alarm relay. The TRIP signal reflects a trip condition (TRIPF) due to any of the protection functions. When this signal is logic 1 the trip relay will assume the trip state provided that the trip relay state-change-permit signal (P24) is logic 1 too. During the inactive mode (F1=1), the change in the state of the trip relay is not permitted. However, during the trip test (TRIPT=1), the change in the state of the trip relay is permitted.

Figure 8:
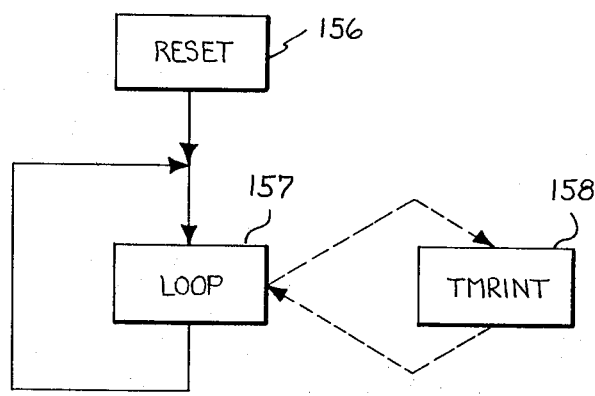
FIG. 8 is the overall flow chart for the motor protection device in accordance with the present invention.

Referring to FIG. 8, the program for the processor one is organized into the following main modules:
1. The Reset program (RESET) 156.
2. The Loop program (LOOP) 157.
3. The Timer Interrupt Program (TMRINT) 158.

At the time of the system initialization, the program control vectors to the beginning of the Reset program. The end of the Reset program marks the beginning of the Loop program. The Loop program is a program-loop.

At fixed intervals of 0.016 seconds a timer interrupt is generated to perform some time dependent functions. The execution of the Loop program is momentarily interrupted and the program control vectors to the beginning of the Timer Interrupt program. The program control returns back to the Loop program at the end of the execution of the Timer Interrupt program. The program control stays with the Loop program until the next Timer Interrupt is generated.

The Reset program performs the following functions:
1. Clears the internal data memory of the processor. Contents of the processor RAM are lost on power loss.
2. Presets the display timer to 3 minutes. The display timer is used to determine 3 minutes of active display time for the function and the value data display. One internal data memory location of the processor is used as this timer.
3. Presets the value of the maximum temperature of the winding RTD's equal to 40° C. One internal data memory location of the processor is used to store this value.
4. Preset the value of the calculated copper temperature, which is used to provide the overload protection, to 85° C.
5. Starts the internal hardware timer which is used to provide timer interrupts.

THE LOOP PROGRAM (LOOP)

The Loop program performs the following functions:
1. Sends command to permit timer interrupt. Without this command the timer interrupt will not be generated.
   (EN TCNTI)
2. Checks for the ground fault alarm and trip conditions. Prepares messages to reflect present conditions.
   (GFAULT)
3. Checks for the phase reversal trip conditions. Prepares a message to reflect present condition.
   (PHAREV)
4. Checks for the phase unbalance alarm and trip conditions. Prepares messages to reflect present conditions.
   (PUNBAL)
5. Checks for the instantaneous overcurrent trip condition. Prepares a message to reflect present condition.
   (INSTOC)
6. Checks for the overload alarm and trip conditions due to the calculated copper temperature. Prepares messages to reflect present conditions.

(OVLCUT)
7. Checks for the overload alarm and trip conditions due to the maximum of winding RTD temperatures. Prepares messages to reflect present conditions.
(OVLWND)
8. Checks for the bearing overtemperature alarm and trip conditions. Prepares messages to reflect present condition.
(OVTBRG)
9. Checks for the Identification Number stored in the external data memory. Sets present ACTIVE/INACTIVE condition.
(IDNMBR)
10. Prepares and sends the following output data reflecting present conditions:
   a. The six LED outputs.
   b. The alarm relay output.
   c. The trip relay output.
(OUTPUT)

TIMER INTERRUPT PROGRAM
(TMRINT)

The Timer Interrupt program performs the following functions:

1. Sends command to select the registers of Bank 1. The Timer Interrupt program uses the working registers of Bank 1 while the Loop program uses the working registers of Bank 0 to prevent their interference with each other.
(SEL RB1)
2. Saves present accumulator data, being used by the Loop program, into one internal data memory (RAM) location of the processor. Restores this data back to accumulator at the end of the Timer Interrupt. Thus the accumulator content will be the same before and after the Timer Interrupt program.
3. Presets the hardware timer to have next timer interrupt after 0.016 second. This results in having timer interrupt every 0.016 second.
4. Updates, every 0.016 second, the ground fault timer which is used to generate the ground fault trip time delay. One internal data memory (RAM) location of the processor is used as the ground fault timer.
(GFTIME)
5. Updates, every 0.016 second, the phase reversal timer which is used to generate the phase reversal trip time delay. One internal data memory (RAM) location of the processor.
(PRTIME)
6. Converts, every 0.016 second, the analog inputs to digital data and stores them into the internal data memory (RAM) of the processor.
(ANALOGI)
7. Determines, every 0.016 second, the maximum of the three low gain phase currents input data and stores it into one internal data memory (RAM) location of the processor.
(MAXLOG)
8. Generates one, 0.016 second time base, clock to determine various times such as ¼ second, 1 second etc. One internal data memory (RAM) location is used as this clock.
(CLOCK)
9. Updates, every 1.024 second, the display timer which is used to determine 3 minutes of active display time for the function and the value data display. One internal data memory (RAM) location is used as this timer.
(ONESEC)
10. Performs, every 0.256 second, calculation to determine present value of the copper temperature which is used to provide overload protection.
(CUTEMP)
11. Prepares, every 0.256 second, the function and the value data to be displayed.
(UPDATE)
12. Determines, every 0.256 second, the maximum temperatures of the winding RTS's. Prepares messages to reflect open RTD.
(MAXRTD)
13. Performs, every 0.256 second, calculations to provide the trip characteristics for the phase unbalance protection.
(PHAUNB)
14. Performs, every 0.016 second, the keyboard service functions.
(KYBORD)
15. Prepares and sends, every 0.016 second, data for the function and the value display.
(DISPLY)

While the present invention has been described with reference to a specific embodiment thereof it will be obvious to those skilled in the art that various changes and modifications may be made without departing from the invention in its broader aspects.

What is claimed is:

1. A motor protection device comprising:
   means for receiving signals indicative of present motor operating conditions including at least signals representative of motor current and motor temperature;
   means for entering field settable data wherein the field settable data comprises motor trip points and motor and system parameters;
   resistance temperature detector means mounted to said motor for providing said motor temperature signals;
   means for providing protective function characteristics based on said field settable data and said signals indicative of present motor operating conditions;
   means for determining protective function values from said protective function characteristics;
   a trip relay;
   means for activating said trip relay when any of said motor trip points is exceeded by the corresponding protective function value; and,
   means for detecting an open resistance temperature detector by checking for a maximum temperature indication.

2. The device in claim 1, wherein said means for entering field settable digital data further comprises means for accepting data within predetermined limits defined for each function.

3. The device in claim 2, wherein the protective functions comprise overload, bearing overtemperature, phase protection, instantaneous overcurrent and ground fault current.

4. The device in claim 3 further comprising:
   a keyboard for entering said field settable data;
   means for visually displaying said keyboard entries; and means for scanning said sensed motor currents and said motor temperatures and displaying them on said means for visually displaying said keyboard entries.

5. An apparatus adapted to interrupt the coupling of a three phase AC source to a three phase motor responsive to actual phase unbalance exceeding a maximum allowable phase unbalance comprising:
  (a) sensing means adapted for providing three phase current signals, each being representative respectively of the current magnitudes in each of the three conductors coupling the source to the motor;
  (b) comparison means for deriving the maximum one and the minimum one of said three signals;
  (c) first means responsive to said maximum and minimum ones of said three signals for deriving an actual phase unbalance magnitude signal which is a function of the difference between said maximum one and said minimum one of said three signals;
  (d) second means for operator entry of parameters representative of maximum allowable phase unbalance;
  (e) third means responsive to said first and second means for deriving a normalized unbalance current signal representative of the ratio of said actual and said maximum allowable phase unbalance magnitudes;
  (f) fourth means responsive to said normalized unbalance current signal exceeding a predetermined magnitude for generating from said unbalance current signal squared, an unbalance level signal approximating the heating characteristic of said motor responsive to phase unbalance;
  (g) switching means responsive to said unbalance level signal attaining a predetermined magnitude adapted to interrupt the coupling between the source and the motor.

6. The apparatus of claim 5 wherein said sensing means comprises means for obtaining the rectified average of said currents in each of said three conductors.

7. The apparatus of claim 5 wherein said first means further comprises means for comparing said minimum of said three signals to a predetermined value and permitting an unbalance level to be determined only if said predetermined value is not exceeded, whereby premature motor interruption during motor start-up is avoided.

8. The apparatus of claim 7 wherein said first means further comprises means for limiting the maximum one of said signals to a predetermined value in deriving said actual phase unbalance magnitude signal.

9. The apparatus of claim 5 wherein said fourth means comprises means for time intergrating said squared unbalance current signal to derive said unbalance level signal, wherein said time integrating is accomplished with a predetermined time constant.

10. The apparatus of claim 9 wherein said fourth means comprises means responsive to said unbalance current signal exceeding said predetermined magnitude, to increment the magnitude of said unbalance level signal by the sequential addition thereto of an incremental signal representative of the square of said unbalance current signal.

11. The apparatus of claim 10 wherein said fourth means comprises means responsive to the magnitude of said unbalance current signal being below said predetermined magnitude, to decrease the magnitude of said unbalance level signal by sequentially decrementing the magnitude of said unbalance level signal by a predetermined magnitude, whereby motor cooling is simulated.

12. The apparatus of claims 5, 6, 7, 8, 9, 10 or 11 wherein said second means comprises operator entry of parameters representative of full load motor current and of the ratio of maximum allowable phase unbalance to the full load current, and further comprising means for generating a maximum allowable phase unbalance signal which is a function of the product of the aforesaid parameters.

13. A motor protection device having data input terminals for receiving a plurality of signals representative of motor operating parameters including at least signals representative of motor current and motor temperature, trip point input terminals for entering into the device a plurality of trip point values representative of values of motor current and temperature at which it is desired to provide an alarm signal and to interrupt power to the motor, apparatus within the device for deriving from the trip point values a set of protective function characteristics and apparatus for deriving protective function values from the protective function characteristics for comparison to the motor operating parameters signals, wherein the improvement comprises means in the device responsive to an external command for simulating a data input signal representative of a continuous rise in motor temperature whereby the apparatus for deriving protective function characteristics and the apparatus for deriving protective function values can be tested by observing generation of the alarm signal and interruption of power to the motor.

* * * * *